(12) United States Patent
Su

(10) Patent No.: US 7,002,458 B2
(45) Date of Patent: Feb. 21, 2006

(54) VEHICULAR TURNING INDICATOR

(75) Inventor: Wen-Wei Su, Hsinchu (TW)

(73) Assignee: Exon Science, Inc., Taoyuan (TW)

( * ) Notice: Subject to any disclaimer, the term of this patent is extended or adjusted under 35 U.S.C. 154(b) by 108 days.

(21) Appl. No.: 10/653,610

(22) Filed: Sep. 2, 2003

(65) Prior Publication Data

US 2005/0062597 A1    Mar. 24, 2005

(51) Int. Cl.
*B60Q 1/34* (2006.01)

(52) U.S. Cl. ............... 340/465; 340/463; 340/464; 340/468; 340/469; 340/475; 340/478

(58) Field of Classification Search ............ 340/465, 340/463, 464, 466, 467, 468, 469, 471, 475, 340/478; 701/1
See application file for complete search history.

(56) References Cited

U.S. PATENT DOCUMENTS

| | | | | |
|---|---|---|---|---|
| 4,868,719 A | * | 9/1989 | Kouchi et al. | ............. 362/545 |
| 5,157,382 A | * | 10/1992 | Stopa | ......................... 340/475 |
| 5,253,115 A | * | 10/1993 | Ueno | ......................... 359/838 |
| 5,673,019 A | | 9/1997 | Dantoni | |
| 5,712,618 A | * | 1/1998 | McKenna | .................. 340/475 |
| 6,768,933 B1 | * | 7/2004 | Serezat | ......................... 701/1 |

* cited by examiner

*Primary Examiner*—Toan N. Pham
(74) *Attorney, Agent, or Firm*—Madson & Metcalf

(57) ABSTRACT

A vehicular turning indicator is used for automatically showing a turning degree of a vehicle. The vehicular turning indicator includes a sensor sensing a turning angle of the vehicle; a control device asserting a control signal according to the turning direction, the turning angle and optionally the speed of the vehicle; and a plurality of lightening units in communication with the control device brightening to constitute a variable pattern in response to the control signal. The vehicular turning indicator can be implemented by currently existent vehicular lamps such as indicator light, brake light or head-up display, be incorporated into an existent vehicular accessory such as rearview mirror module or auxiliary brake light module, or independently mounted to the vehicle. Preferably, special flashing effects are performed to make the turning indication prominent.

155 Claims, 28 Drawing Sheets

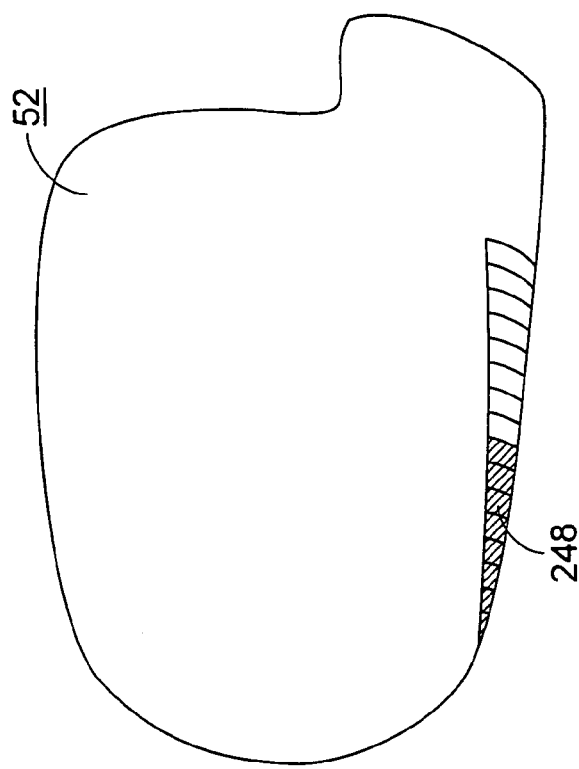
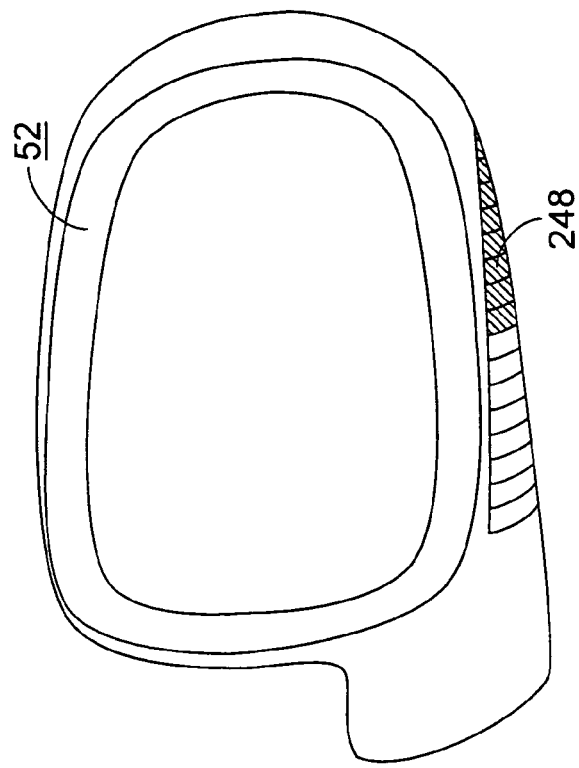

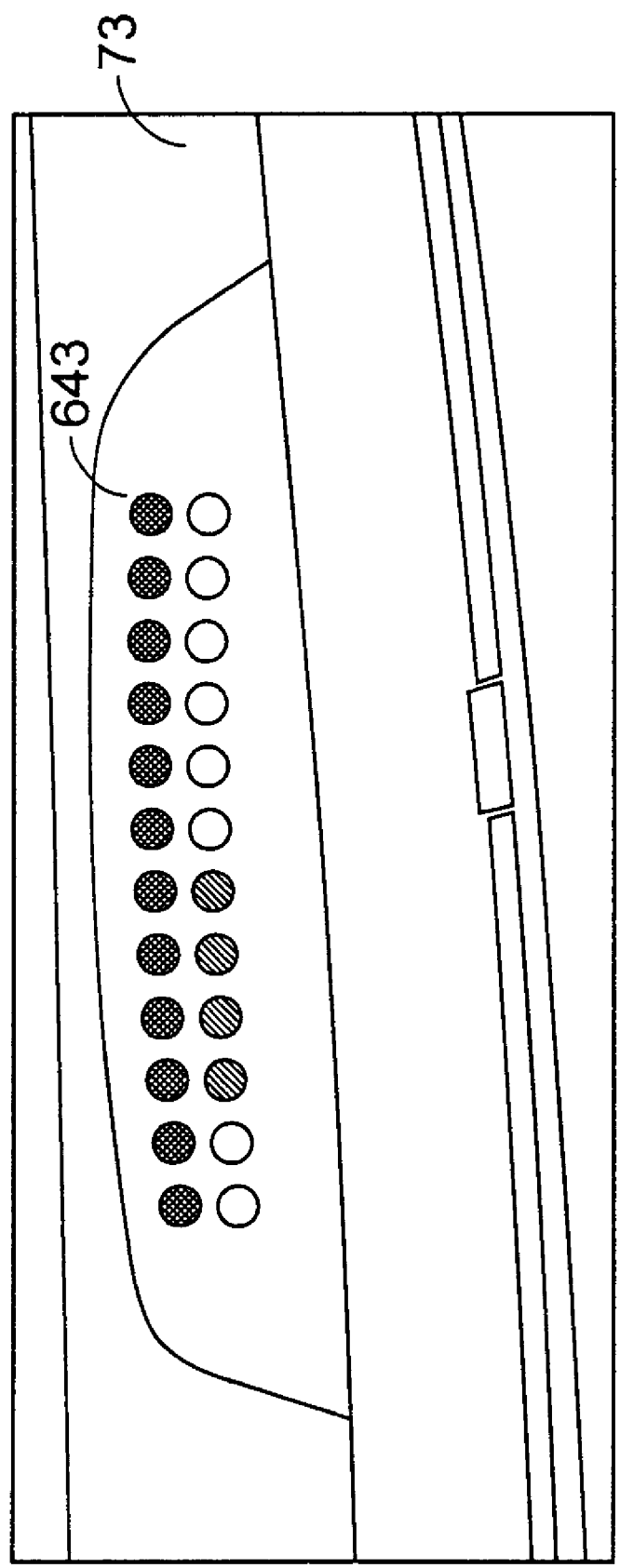

| Angle(°) / Speed (km/hr) | -360+90 | -360 | -180 | -90 | -60 | -15 | -5 | 0 | +5 | +15 | +60 | +90 | +180 | +360 | +360+90 |
|---|---|---|---|---|---|---|---|---|---|---|---|---|---|---|---|
| 0 | 6 | 5 | 4 | 3 | 2 | 1 | 0 | 0 | 0 | 1 | 2 | 3 | 4 | 5 | 6 |
| 20 | 6 | 6 | 5 | 4 | 3 | 2 | 1 | 0 | 1 | 2 | 3 | 4 | 5 | 6 | 6 |
| 60 | 6 | 6 | 6 | 6 | 5 | 3 | 2 | 0 | 2 | 3 | 5 | 6 | 6 | 6 | 6 |
| 90 | 6 | 6 | 6 | 6 | 6 | 6 | 3 | 0 | 3 | 6 | 6 | 6 | 6 | 6 | 6 |
| 90↑ | 6 | 6 | 6 | 6 | 6 | 6 | 5 | 0 | 5 | 6 | 6 | 6 | 6 | 6 | 6 |

Fig.12A

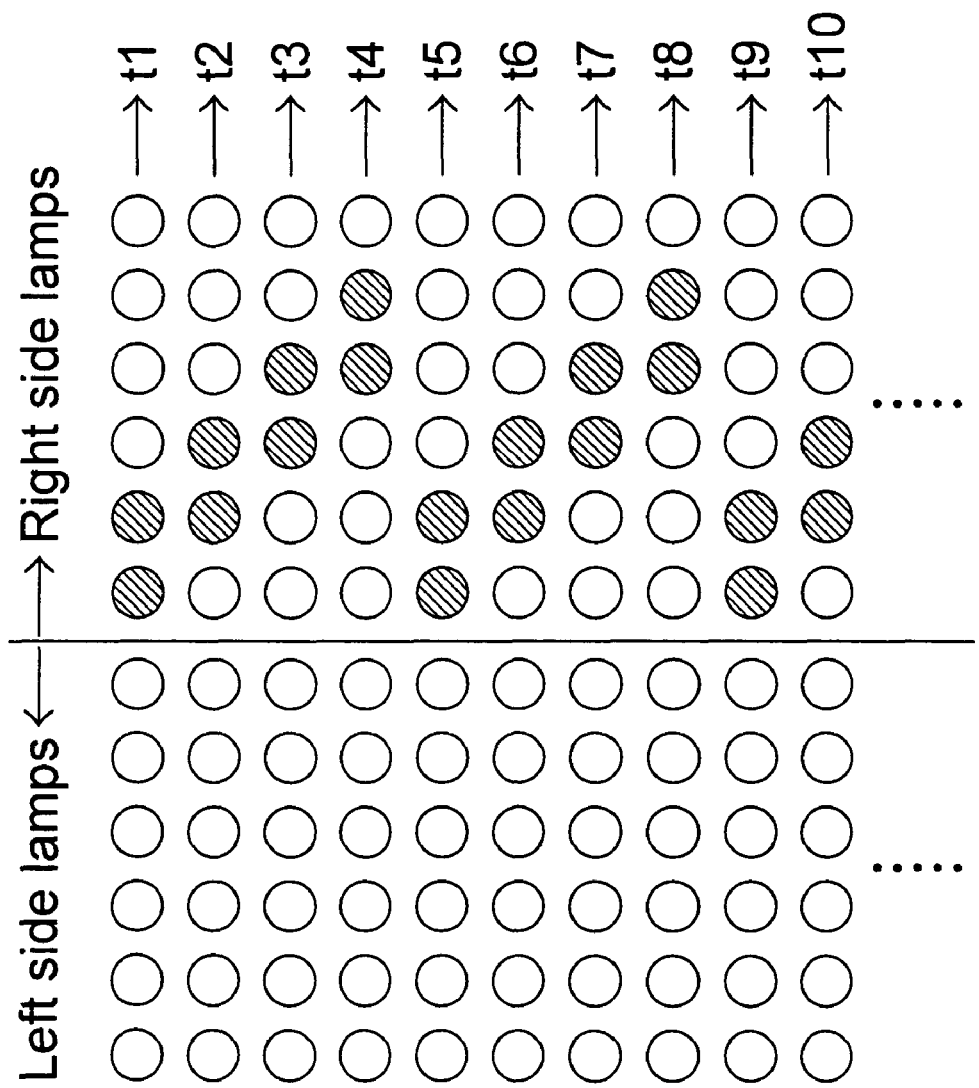

VEHICULAR TURNING INDICATOR

FIELD OF THE INVENTION

The present invention relates to a turning indicator, and more particular to a vehicular turning indicator enabled to dynamically show the turning status of a vehicle.

BACKGROUND OF THE INVENTION

When a driver is driving his car, other drivers therebehind may need to know what he intends to do. For example, when the front driver is going to change lanes from a right one to a left one, he needs to turn the steering wheel leftwards to have the car approach the left lane. Meanwhile, the drivers originally at the left lane behind the lane-changing car shall keep their eyes on the turning car to avoid collision. Generally, a left indicator light flashing with orange light is enabled by the front driver to warn the drivers therebehind at this time. Sometimes, however, the front driver may forget to switch on the indicator light so that the approaching of the front car is not obvious or does not hold attention from the rear cars. Many car accidents occur under this circumstance. Therefore, it is preferred that the turning of the car is notified automatically to warn other drivers.

Desirably, a vehicular turning indicator enabled to dynamically show the turning status of a vehicle is provided. By lightening up different numbers of lamps according to different turning degrees, the other drivers of vehicles around the present vehicle and even the driver himself of the present vehicle can clearly understand the moving situation of the vehicle. Therefore, the drivers can well respond to the situation so as to assure of safety on the road.

U.S. Pat. No. 5,673,019 described an automatic turn signal and safety device to solve the problem. As shown in FIG. 1, six lamps L1~L6 are arranged at the left side of a vehicle and other six lamps R1~R6 are arranged at the right side. The prior art device comprises a disc 10 sleeved around the steering column 20, three wiper electrodes 11, 12 and 13, three left disc electrodes 14, 15 and 16, and three right disc electrodes 17, 18 and 19. Originally the wiper electrodes 11, 12 and 13 are in the neutral area of the disc as shown when there is no turning operation of the steering wheel. The three left disc electrodes 14, 15 and 16 are electrically connected to the three sets of lamps (L1, L2), (L3, L4) and (L5, L6) via wires W1, W2 and W3, respectively. The three right disc electrodes 17, 18 and 19 are electrically connected to the three sets of lamps (R1, R2), (R3, R4) and (R5, R6) via wires W4, W5 and W6, respectively. When the car is made a slight right turn, it is only the wiper electrode 11 in electric contact with the right disc electrode 17. Accordingly, positive current flows from the electrode 17 to the wire W4 to turn on the lamps R5 and R6. If the car is made further turn to an intermediate level, both of the wiper electrodes 11 and 12 are in contact with respective right disc electrodes 17 and 18. Accordingly, two sets of lamps (R5, R6) and (R3, R4) are turned on. Likewise, an even large turning degree turns all the six right lamps R1~R6 on.

Similar operations are applicable to the left turning signals. When the car is made a slight left turn, it is only the wiper electrode 11 in electric contact with the left disc electrode 14. Accordingly, positive current flows from the electrode 14 to the wire W1 to turn on the lamps L5 and L6. If the car is made further turn to an intermediate level, both of the wiper electrodes 11 and 12 are in contact with respective left disc electrodes 14 and 15. Accordingly, two sets of lamps (L5, L6) and (L3, L4) are turned on. Likewise, an even large turning degree turns all the six left lamps L1~L6 on. Therefore, by flashing different numbers of lamps, the rear drivers can understand how the front car is moving. Since the lamps are arranged in the front of or in the rear of the vehicle, the driver himself cannot see the change of the lamps.

Although the prior art device as shown in FIG. 1 is capable of warning other drivers of the turning operation, the circuitry is complicated and the effect is limited. For example, three lamps only at each side are difficult to hold attention from other drivers unless the lamps are large enough. The large size of the lamps, however, occupies too much space of the vehicle body and may have bad effect on the look of the vehicle. Moreover, the turning degree can only be roughly expressed by the three lamps at each side. If more lamps are used, the above-mentioned problems are even serious. In addition, more wiper electrodes, disc electrodes and connecting wires are needed to optionally turn the lamps on.

On the other hand, when the speed of the car is fast, a much more prominent turn signal is required to notify the rear drivers. The above-mentioned prior art, however, does not take this effect into consideration.

SUMMARY OF THE INVENTION

Therefore, an object of the present invention is to provide a vehicular turning indicator to automatically show the turning degree of a vehicle, which is implemented by currently existent vehicular lamps.

Another object of the present invention is to provide a vehicular turning indicator to automatically show the turning degree of a vehicle, which is incorporated into an existent vehicular accessory.

A further object of the present invention is to provide a vehicular turning indicator to automatically show the turning degree of a vehicle, which utilizes various flashing effects to make the turning indication prominent so as to hold attraction from other drivers.

A further object of the present invention is to provide a vehicular turning indicator to automatically show the turning degree of a vehicle, which allows the driver himself to see the turning indication so as to realize the vehicular turning status.

A further object of the present invention is to provide a vehicular turning indicator to automatically show the turning degree of a vehicle, which operates depending on the speed of the vehicle.

According to a first aspect of the present invention, the vehicular turning indicator for automatically showing a turning degree of a vehicle, comprises a sensor sensing a turning angle of the vehicle; a control device asserting a first control signal in response to an ON state of an indicator light switch and asserting a second control signal according to the turning angle; and a plurality of lightening units in communication with the control device, selectively brightening to constitute a constant pattern in response to the first control signal, and selectively brightening to constitute a variable pattern in response to the second control signal.

According to a second aspect of the present invention, the vehicular turning indicator for automatically showing a turning degree of a vehicle, comprises a sensor sensing a turning angle of the vehicle; a control device asserting a first control signal in response to a brake operation and asserting a second control signal according to the turning angle; and a plurality of lightening units in commnunication with the control device, selectively brightening to constitute a constant pattern in response to the first control signal, and selectively brightening to constitute a variable pattern in response to the second control signal.

According to a third aspect of the present invention, the vehicular turning indicator for automatically showing a turning degree of a vehicle, comprises a sensor sensing a turning angle of the vehicle; a control device asserting a control signal according to the turning angle; and a plurality of lightening units in communication with the control device, integrated into a rearview mirror module and selectively brightening to constitute a variable pattern in response to the control signal.

According to a fourth aspect of the present invention, the vehicular turning indicator for automatically showing a turning degree of a vehicle, comprises a sensor sensing a turning angle of the vehicle; a control device asserting a control signal according to the turning angle; and a first series of lightening units in communication with the control device, integrated into an auxiliary brake light module including a second series of lightening units brightening in response to a brake operation, and selectively brightening to constitute a variable pattern in response to the control signal.

According to a fifth aspect of the present invention, the vehicular turning indicator for automatically showing a turning degree of a vehicle, comprises a sensor sensing a turning angle of the vehicle; a control device asserting a control signal according to the turning angle; and a plurality of light emitting elements in communication with the control device, integrated into a head-up display module, and emitting light to constitute a variable pattern in response to the control signal.

According to a sixth aspect of the present invention, the vehicular turning indicator for automatically showing a turning degree of a vehicle, comprises a sensor sensing a turning angle of the vehicle; a plurality of lightening units independently optionally brighten according to the turning angle of the vehicle; and a control device in communication with the sensor and the plurality of lightening units, designating the maximum number of the plurality of lightening units to brighten according to the turning angle, and controlling the designated lightening units to sequentially twinkle in a predetermined manner.

Preferably, the sensor is mounted to a steering wheel of the vehicle for detecting a rotation degree of the steering wheel, and outputting a digital signal indicative of the turning angle according to the rotation degree of the steering wheel.

Preferably, the control device comprises: a micro-processor in communication with the sensor, determining the maximum number of the plurality of lightening units to brighten and the predetermined manner according to the turning angle; and a control unit in communication with the micro-processor and the plurality of lightening units, sequentially twinkling the maximum number of lightening units in the predetermined manner.

Preferably, the maximum number of the plurality of lightening units to brighten is determined according to a lookup table.

Preferably, the control device determines the maximum number of the plurality of lightening units to brighten according to the turning angle and a speed of the vehicle.

In one embodiment, a first pattern is formed by turning on a first maximum number of the lightening units designated at a certain turning direction, a certain turning angle and a first speed of the vehicle, and a second pattern is formed by turning on a second maximum number of the lightening units designated at the certain turning direction, the certain turning angle and a second speed of the vehicle, and the first maximum number of the lightening units is different from the second maximum number of the lightening units if the first speed is different from the second speed. Preferably, the first maximum number of the lightening units is greater than the second maximum number of the lightening units if the first speed is higher than the second speed.

In one embodiment, a first pattern is shown at a certain turning direction, a certain turning angle and a first speed of the vehicle, and a second pattern is shown at the certain turning direction, the certain turning angle and a second speed of the vehicle, and an end lightening unit that brightens in the first pattern is closer to the turning direction than an end lightening unit that brightens in the second pattern is if the first speed is higher than the second speed.

Preferably, the luminance of the lightening units varies with the speed of the vehicle. For example, the luminance of the lightening units increases with the speed of the vehicle.

Preferably, the color of the lightening units varies with the speed of the vehicle.

Preferably, the color of the lightening units varies with the turning degree of the vehicle.

Preferably, the luminance of the lightening units varies with the turning degree of the vehicle.

For example, the plurality of lightening units are disposed on the body of the vehicle between the trunk door and the bumper.

For example, the plurality of lightening units are disposed on the body of the vehicle between the engine room and the bumper.

For example, the plurality of lightening units are disposed on the body of the vehicle under a lamp assembly.

For example, the lamp assembly comprises an indicator light, a backup light, a brake light, an auxiliary brake light and/or a headlight lamp.

For example, the plurality of lightening units are arranged in a linear manner, a concentric manner or a helix manner.

For example, the plurality of lightening units are disposed in the interior rearview mirror module.

For example, the plurality of lightening units are disposed in the exterior rearview mirror module.

For example, the plurality of lightening units are disposed on the housing of the exterior rearview mirror module.

For example, the plurality of lightening units include at least two sets of lightening units for emitting different colors.

For example, the predetermined manner includes a step of sequentially and accumulatively brightening the lightening units one by one until the maximum number of the lightening units is reached.

For example, the predetermined manner further includes a step of sequentially and accumulatively darkening the lightening units one by one after the maximum number of the lightening units all illuminate.

For example, the predetermined manner includes a step of sequentially and accumulatively brightening the lightening units portion by portion until the maximum number of the lighting units is reached, wherein portions illuminating at two adjacent time points include at least one common lightening unit.

For example, the predetermined manner includes a step of sequentially darkening one of the maximum number of the lightening units after the maximum number of the lightening units all illuminate.

According to a seventh aspect of the present invention, a vehicular turning indicator for automatically showing a turning degree of a vehicle, comprises a first sensor sensing a turning angle of the vehicle; a second sensor sensing a speed of the vehicle; a control device asserting a control signal according to the turning angle and the speed of the vehicle; and a plurality of lightening units in communication with the control device, selectively brightening to constitute a variable pattern in response to the control signal.

BRIEF DESCRIPTION OF THE DRAWINGS

The present invention may best be understood through the following description with reference to the accompanying drawings, in which:

FIGS. 5B~5D are schematic diagrams exemplifying the arrangement of the vehicular turning indicator of FIG. 2 on the housing of the external rearview mirror module;

FIG. 8 is a schematic diagram exemplifying the arrangement of the vehicular turning indicator of FIG. 6 in the auxiliary brake lamp module;

FIG. 12A is an example of the lookup table for use in the vehicular turning indicator of FIG. 11;

FIGS. 15A~15D are schematic diagrams exemplifying various lamp patterns shown by the vehicular turning indicator of FIG. 13.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

The vehicular turning indicator for automatically showing a turning direction and a turning degree of a vehicle can be implemented by or incorporated into currently existent vehicular lamps such as an indicator light, a brake light or a head-up display according to one aspect of the present invention.

Figure 1:
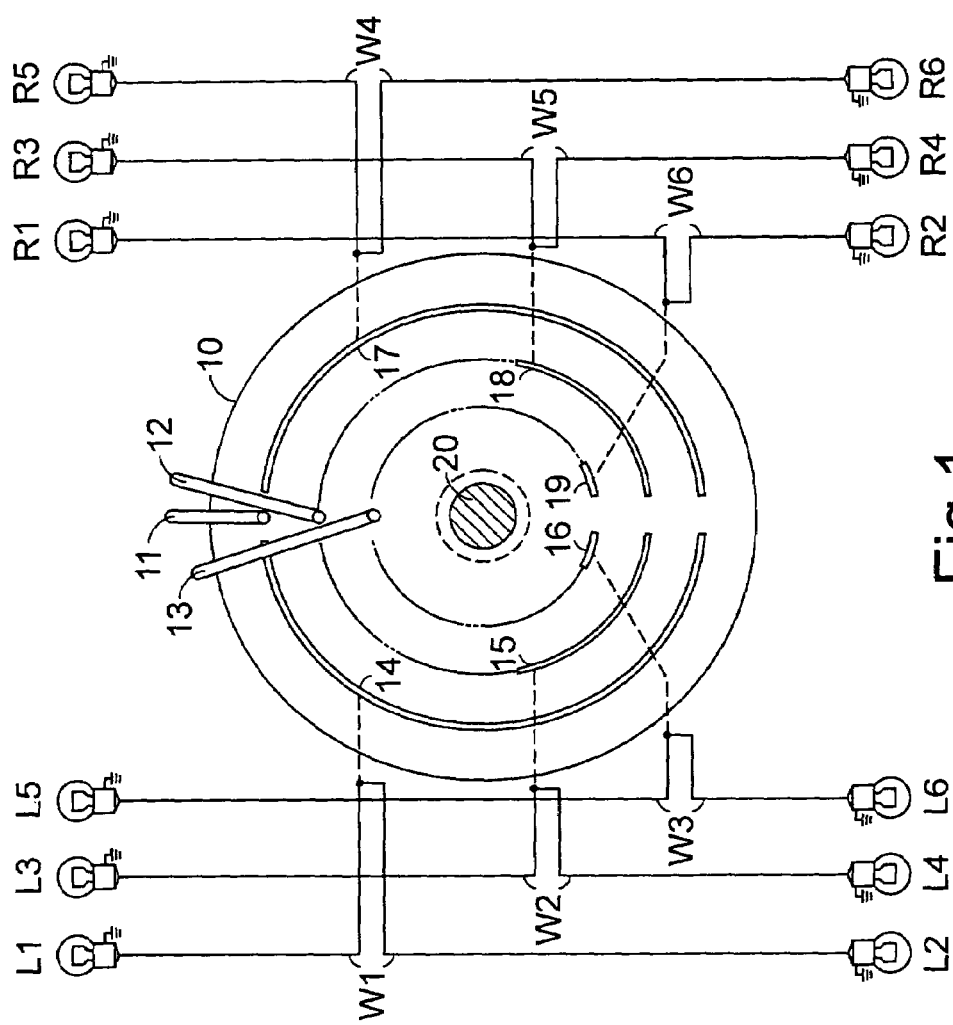
FIG. 1 is a schematic diagram showing a conventional vehicular turning indicator.
Figure 2:
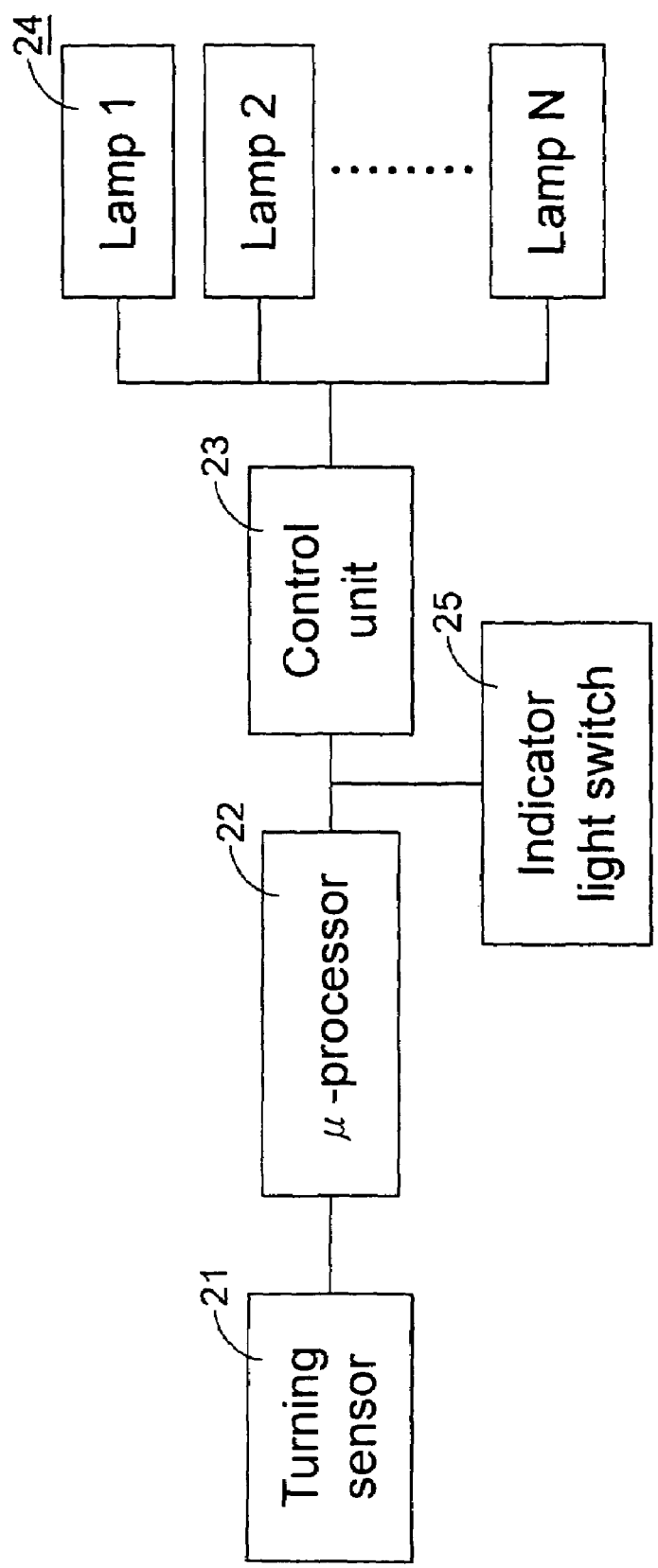
FIG. 2 is a block diagram showing a vehicular turning indicator according to an embodiment of the present invention.

Please refer to FIG. 2 which shows a first embodiment of the vehicular turning indicator according to the present invention. In this embodiment, the vehicular turning indicator is implemented by an indicator light, In other words, the vehicular turning indicator performs dual functions, one for direction indicator light and the other for dynamic turning indication light. In the former case, the vehicular turning indicator is enabled in a constant pattern to show that the vehicle is going to take a turn in response to an ON state of an indicator light switch. In the latter case, the vehicular turning indicator is enabled in a variable pattern to show that the vehicle is now turning and show the turning degree of the vehicle as well.

The vehicular turning indicator shown in FIG. 2 includes a turning sensor 21, a micro-processor 22, a control unit 23 and a series of lightening units known together as lamps 24 intercommunicated as shown. The control unit 23 is further in communication with the indicator light switch 25. It is to be noted that the connecting lines among these devices as shown do not indicate the connection of these devices essentially by wires or cables. Alternatively, they can communicate with one another via a vehicular digital bus such as a controller area network (CAN) or vehicle area network (VAN) bus. The sensor 21 is mounted to a steering wheel (not shown) of the vehicle for detecting a rotation degree of the steering wheel, and outputting a digital signal indicative of the turning direction and the turning angle according to the rotation degree of the steering wheel. A commercial sensor, such as a 9850 Gen II Series sensor or an NCAPS® Thin Profile sensor commercially available from BEI Technologies Inc. (California, USA), can be applied hereto to achieve the above purpose.

Figure 3A:
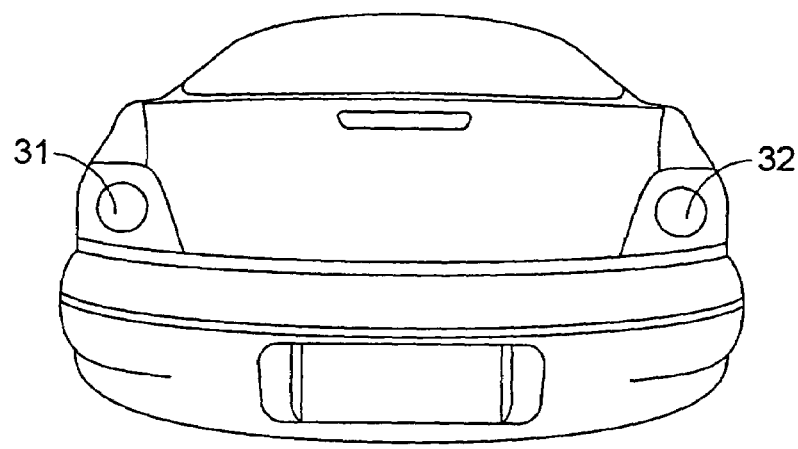
FIG. 3A is schematic diagram exemplifying the arrangement of the vehicular turning indicator of FIG. 2 on the vehicle body.
Figure 3B:
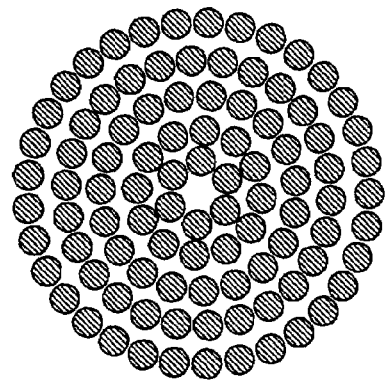
FIGS. 3B and 3C are schematic diagram exemplifying two constant patterns appearing when the indicator light switch of FIG. 2 is enabled.
Figure 3C:
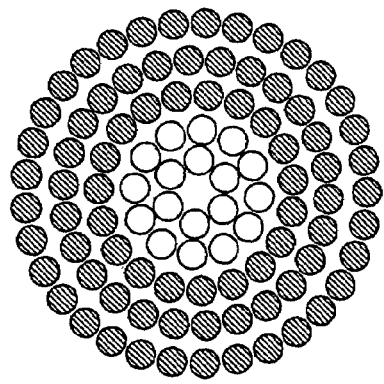

When the control unit 23 receives a signal indicative of the ON state of the indicator light switch 25 for right turn, a control signal is asserted to turn on a selected portion of the lamps 24 associated with the right side to constitute a constant pattern. For example, all the lamps 24 associated with the right side are turned on or just some constant lamps are turned on. Taking circular vehicular turning indicators 31 and 32 suitably to be disposed at right and left rear corners of the body of the vehicle, as shown in FIG. 3A, as an example, the constant pattern for either of the vehicular turning indicators 31 and 32 can be exemplified as that shown in FIG. 3B or 3C. In the drawings, each small circle represents a single lamp, and the circles with and without hatch lines indicate brightening and non-brightening lamps, respectively. On the other hand, if the indicator light switch 25 is not enabled by the driver so as to be in an OFF state, but a digital signal is outputted by the sensor 21 to indicate a turning-right operation of the vehicle, the micro-processor 22 determines how many and what ones of the lamps at the right side should be turned on in response to the digital signal in connection with the turning direction and turning degree. Then, the control unit 23 variably turns on the lamps of the right vehicular turning indicators 32 to show the desired pattern determined by the micro-processor 22. An example will be illustrated herein for further understanding.

Figure 4A:
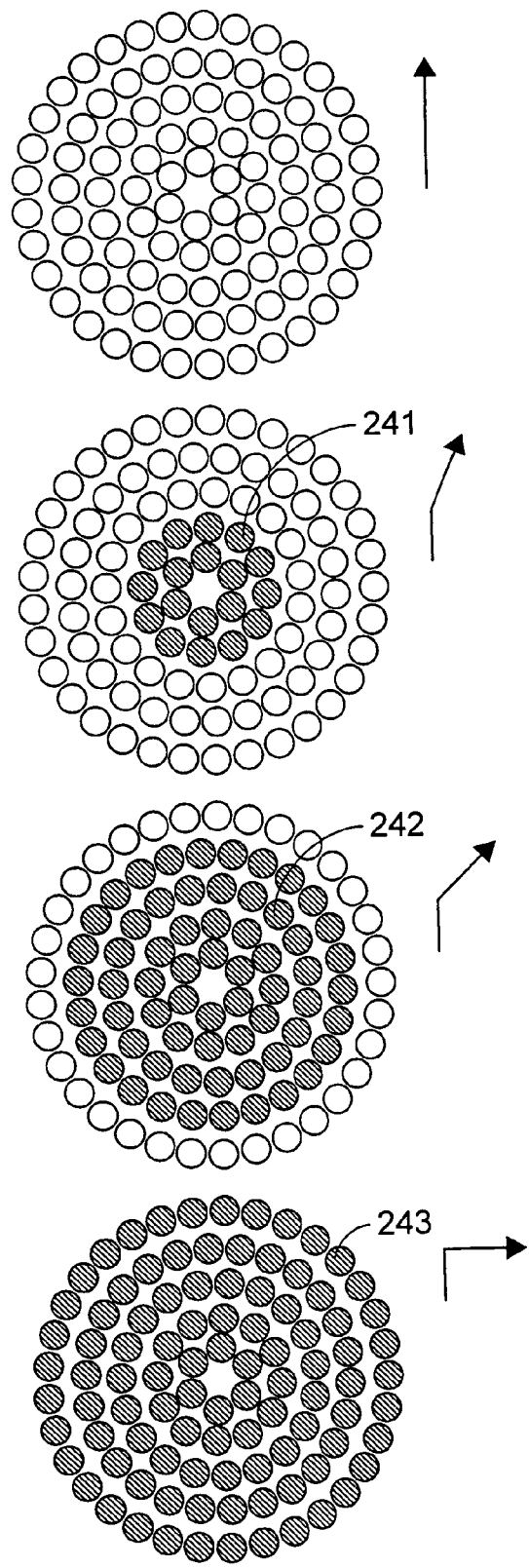
FIGS. 4A and 4B are schematic diagram exemplifying two variable patterns appearing when the turning sensor of FIG. 2 detects the turning action of the vehicle.
Figure 4B:
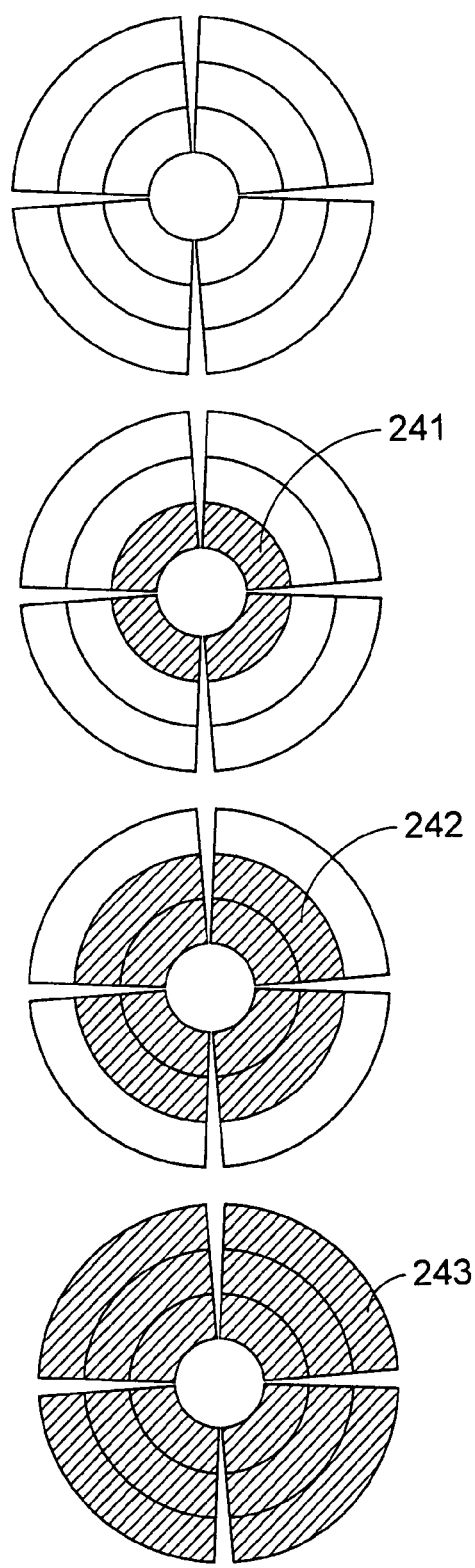

Please refer to FIG. 4A or 4B which schematically exemplifies the pattern-changing process of the right vehicular turning indicator 32 of this embodiment. When the vehicle is moving straightforward, no lamp is turned on. When the vehicle is making slight right turn, a small portion 241 of lamps of the vehicular turning indicator 32 brighten to warn others. If the vehicle is making further right turn, a larger portion 242 of lamps brighten to indicate a right turn with a larger degree. Of course, if the vehicle makes a sharp turn, all the lamps 243 will be turned on to exhibit prominent warning effect. By this way, other drivers can timely understand what direction the present vehicle is moving toward.

For modern cars, the indicator lights are disposed at various positions on the car in addition to the front and rear sides of the car. For example, rearview mirror modules are popular places for mounting indicator lights. Therefore, the vehicular turning indicator can also be mounted at these places to perform both direction and turning degree indication functions, as mentioned above.

Figure 5A:
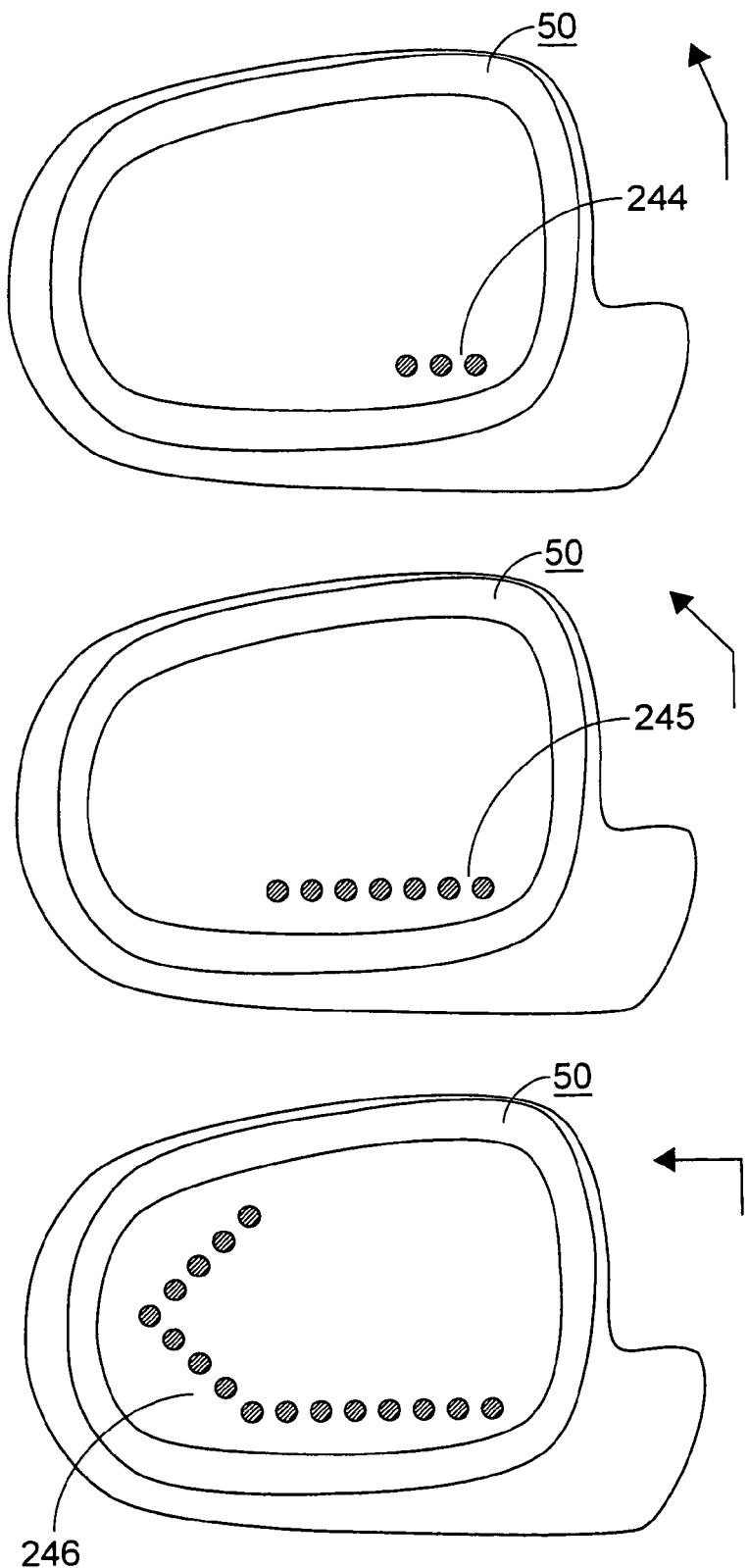
FIG. 5A is a schematic diagram exemplifying the arrangement of the vehicular turning indicator of FIG. 2 in the external rearview mirror module.
Figure 5B:
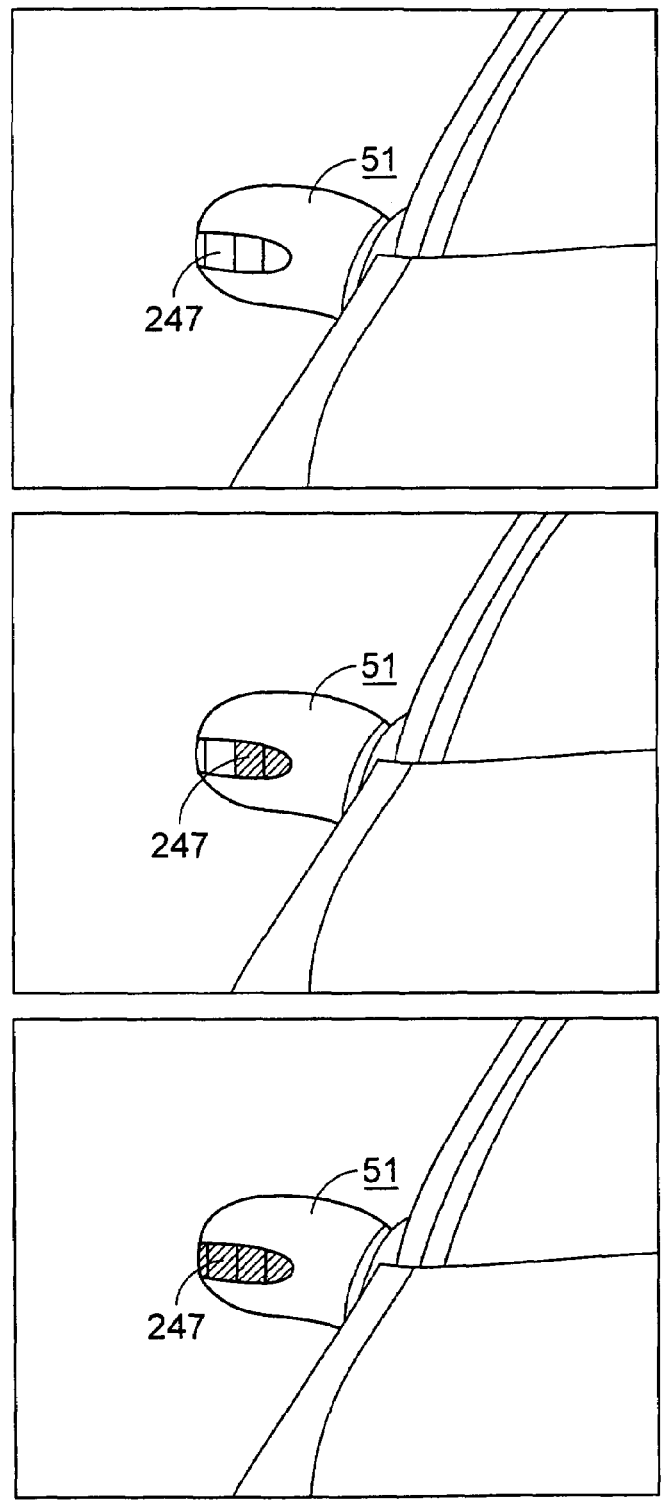
Figure 5E:
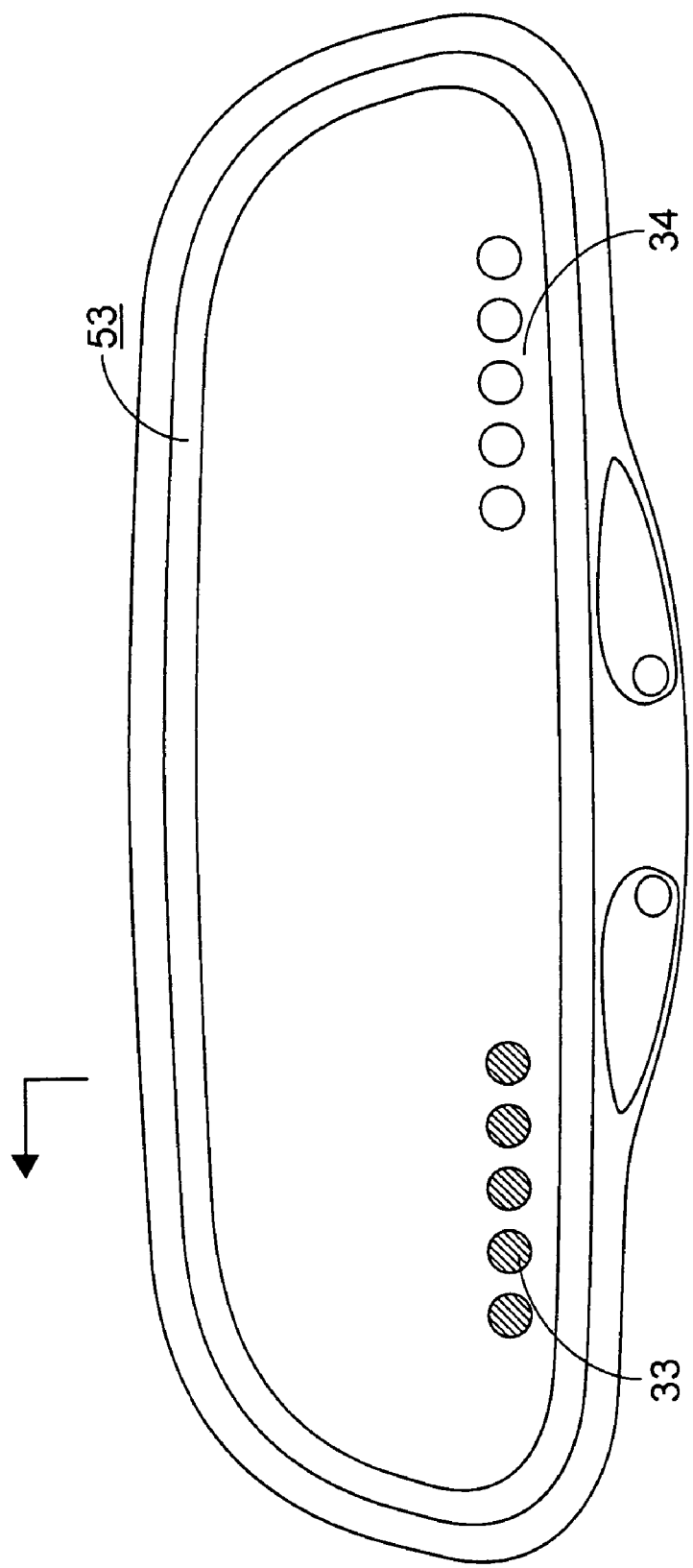
FIG. 5E is a schematic diagram exemplifying the arrangement of the vehicular turning indicator of FIG. 2 in the internal rearview mirror module.

Please refer to FIG. 5A which shows an example in connection with the incorporation of a vehicular turning indicator into an exterior rearview mirror module. The lamps in this example are mounted inside the rearview mirror module 50 and visible through the mirror. When the vehicle is making slight left turn, only a small portion 244 of lamps brighten. If the vehicle is making further left turn, a larger portion 245 of lamps brighten to indicate a left turn with a larger degree. If the vehicle makes a sharp turn, all the lamps 246 will be turned on to exhibit prominent warning effect. Likewise, the lamps 247 mounted onto the housing of the exterior rearview mirror module 51 and facing the vehicular forwarding direction selectively brighten portion by portion to show the degree of right turn, as shown in FIG. 5B. The lamps 248 can also be arranged under the exterior rearview mirror module 52, as shown in FIGS. 5C and 5D, so that both the forward-coming and the rearward-coming drivers can see the lamps. They are selectively turned on to brighten portion by portion to show the degree of right turn in a similar way mentioned above. In addition to the incorporation into respective right and left exterior rearview mirror modules, both the right and left vehicular turning indicators 33 and 34 according to the present invention can be incorporated into the single interior rearview mirror module 53, as shown in FIG. 5E. For example, when the vehicle is making left turn, the driver can confirm what turning degree is achieved by viewing the brightening lamps on the interior rearview mirror 53.

For an indication light with for example orange color, the vehicular turning indicator according to this aspect of the present invention should be able to brighten orange light. In order to achieve this purpose, each single lamp of the vehicular turning indicator can be a filament lamp or a bulb with an orange cover, an orange light emitting diode (LED), an electro luminescence (EL) segment, a fluorescent tube or any other suitable lamp capable of brightening orange light. Alternatively, each lamp can be a bi-color or multi-color lamp which can brighten orange light and another color of light. The control unit 23 (FIG. 2) controls selected lamps to brighten orange light to constitute the constant pattern when the indicator light switch 25 is switched on, and brighten another color of light, e.g. blue light, to show the turning degree.

It is to be noted that the above-described vehicular turning indicator incorporated into a rearview mirror module does not have to exhibit the function of direction indicator light. In other words, the control unit can be exempted from connecting to the indicator light switch, and the vehicular turning indicator simply performs the function of automatically showing the turning degree of the vehicle.

In addition to indicator light, another currently existent vehicular light into which the vehicular turning indicator for automatically showing a turning direction and a turning degree of a vehicle can be incorporated is a brake light.

Figure 6:
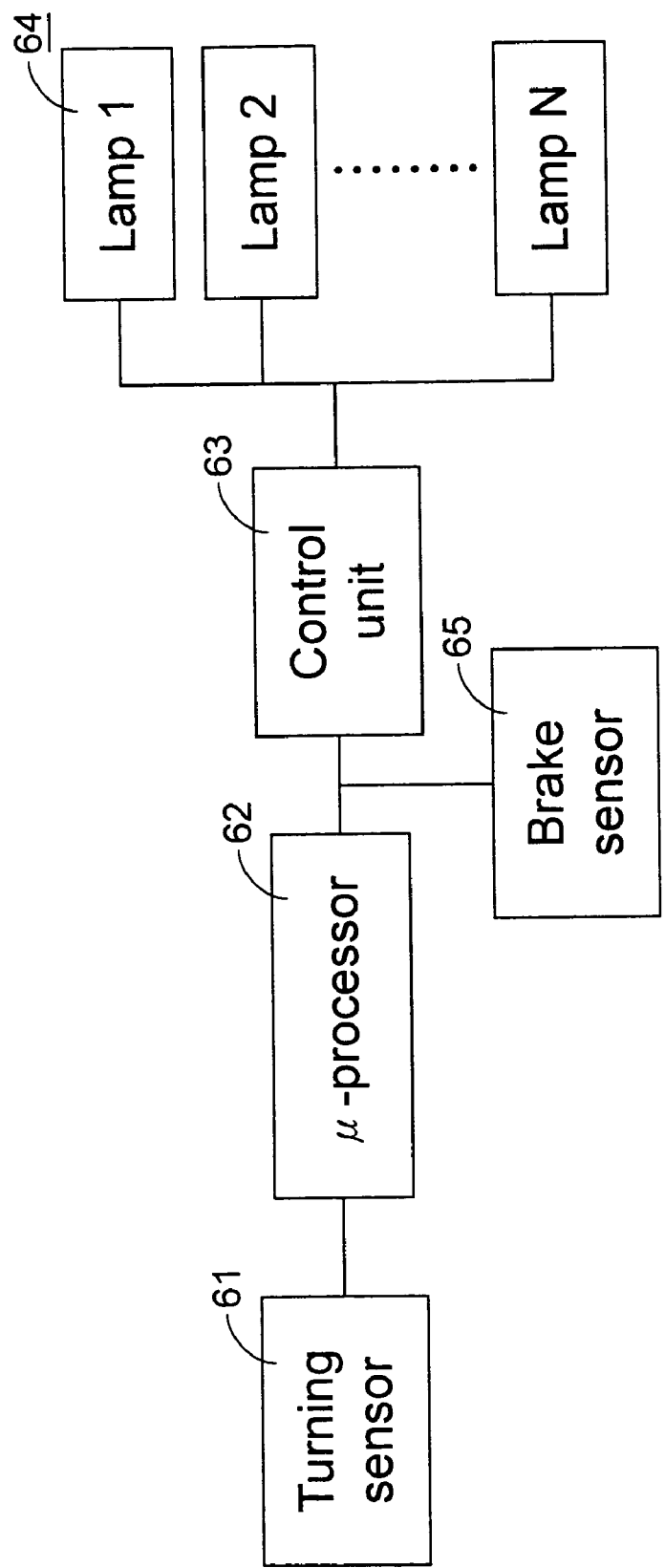
FIG. 6 is a block diagram showing a vehicular turning indicator according to another embodiment of the present invention.

Please refer to FIG. 6 which shows a second embodiment of the vehicular turning indicator according to the present invention. In this embodiment, the vehicular turning indicator is implemented by a brake light. In other words, the vehicular turning indicator performs dual functions, one for brake indication and the other for dynamic turning indication. In the former case, the vehicular turning indicator is enabled in a constant pattern to show that the vehicle is braking. In the latter case, the vehicular turning indicator is enabled in a variable pattern to show that the vehicle is now turning and show the turning degree of the vehicle as well.

The vehicular turning indicator shown in FIG. 6 includes a turning sensor 61, a micro-processor 62, a control unit 63 and a series of lamps 64 intercommunicated as shown. The control unit 23 is further in communication with a brake sensor 65. It is to be noted that the connecting lines among these devices as shown do not indicate the connection of these devices essentially by wires or cables. Alternatively, they can communicate with one another via a vehicular digital bus such as a controller area network (CAN) or vehicle area network (VAN) bus. The sensor 61, like the sensor 21, can be a 9850 Gen II Series sensor or an NCAPS® Thin Profile sensor, which is mounted to a steering wheel (not shown) of the vehicle for detecting a rotation degree of the steering wheel, and outputting a digital signal indicative of the turning direction and the turning angle according to the rotation degree of the steering wheel.

When the control unit 63 receives a signal indicative of the brake operation from the brake sensor 65, a control signal is asserted to turn on a selected portion of the lamps 64 associated with the right side to constitute a constant pattern. For example, all the lamps 64 are turned on or just some constant lamps are turned on. The schematic diagrams of FIGS. 3A~3C and 4 can be used herein for illustrating the dual-functional vehicular turning indicator except that the lights serve as brake lights in stead of indicator lights. As shown in FIG. 3A, the vehicular turning indicators 31 and 32 are disposed at right and left rear corners of the body of the vehicle. When the brake pedal is stepped, the brake sensor 65 informs the control unit 63 of the brake operation so that the constant pattern is shown for each of the vehicular turning indicators 31 and 32. The constant pattern can be exemplified as that shown in FIG. 3B or 3C. On the other hand, if the brake operation is not performed by the driver, but a digital signal is outputted by the sensor 21 to indicate a turning-right operation of the vehicle, the micro-processor 22 determines how many and what ones of the lamps at the right side should be turned on in response to the digital signal in connection with the turning direction and turning degree. Then, the control unit 63 variably turns on the lamps of the right vehicular turning indicators 32 to show the desired pattern determined by the micro-processor 62. The pattern-changing process of the right vehicular turning indicator 32 is shown with reference to FIG. 4.

Generally, the brake light is stipulated to be red. Therefore, the vehicular turning indicator according to this aspect of the present invention should be able to brighten red light. In order to achieve this purpose, each single lamp of the vehicular turning indicator can be a filament lamp or a bulb with a red cover, a red light emitting diode (LED), an electro luminescence (EL) segment, a fluorescent tube, or any other suitable lamp capable of brightening red light. Alternatively, each lamp can be a bi-color or multi-color lamp which can brighten red light and another color of light. The control unit 63 (FIG. 6) controls selected lamps to brighten red light to constitute the constant pattern when the brake sensor 65 detects a brake operation, and brighten another color of light, e.g. orange light, to show the turning degree.

Figure 7A:
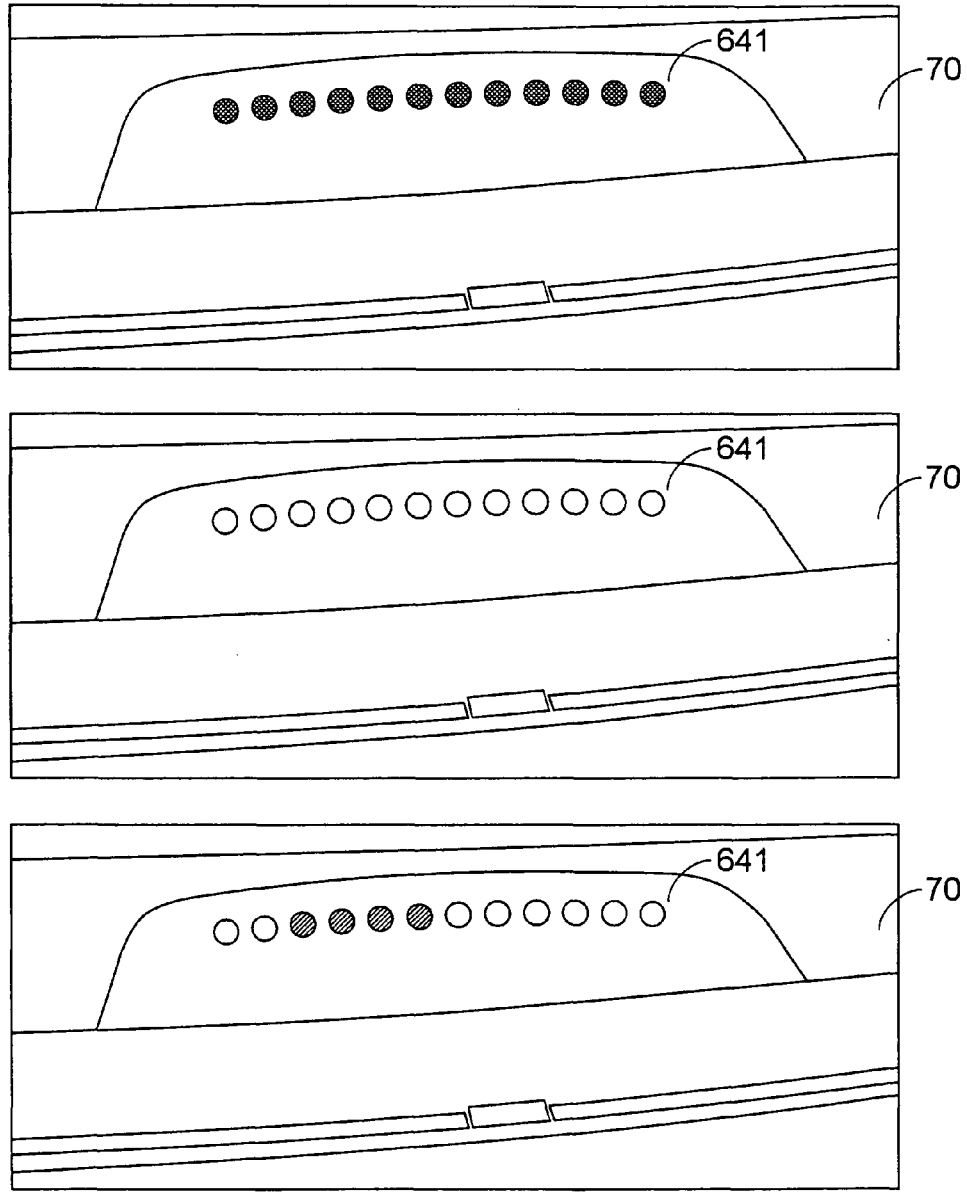
FIGS. 7A~7C are schematic diagrams exemplifying the integration of the vehicular turning indicator of FIG. 6 with the auxiliary brake lamps.
Figure 7B:
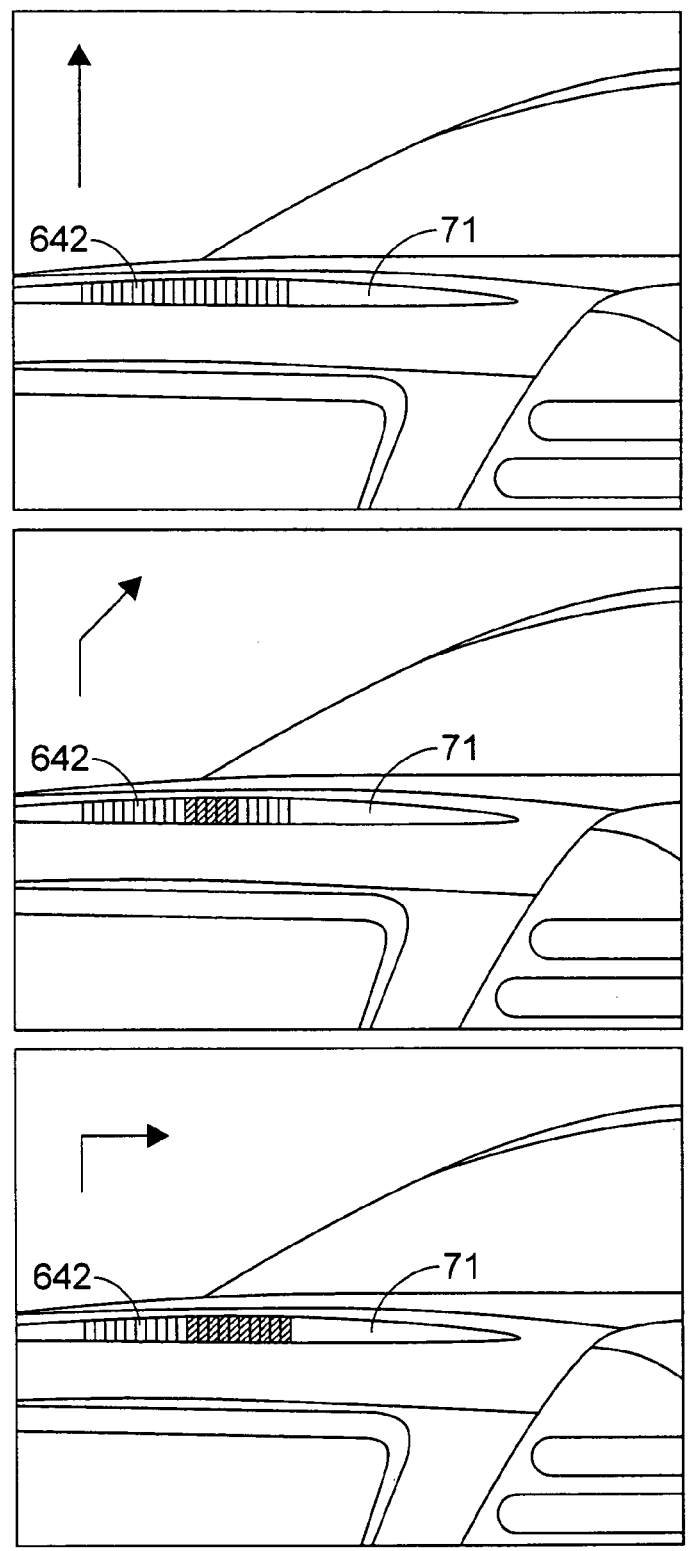
Figure 7C:
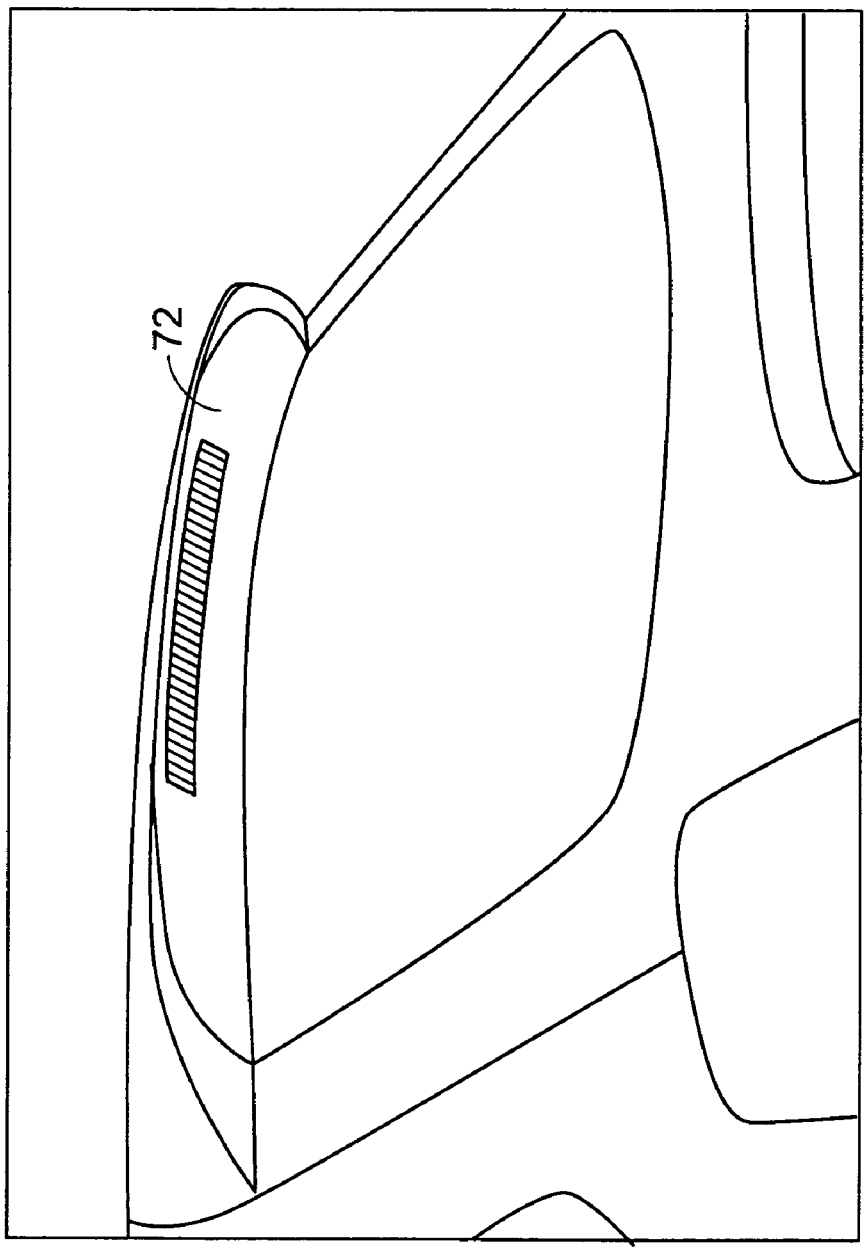

In addition to primary brake light, most cars are equipped with auxiliary brake lights. Some auxiliary brake lights 641 are disposed near the rear windscreens 70 inside the cars, as shown in FIG. 7A, and some auxiliary brake lights 642 are arranged on rear spoilers of the cars, either on the rear wings 71 as shown in FIG. 7B or on the up door spoilers 72 as shown in FIG. 7C. Please refer to FIG. 7A which shows an example in connection with the incorporation of a vehicular turning indicator into a first kind of auxiliary brake light module. When the control unit 63 receives a signal indicative of a brake operation detected by the brake sensor 65, a control signal is asserted to turn on all the lamps 641 to brighten red light. When the car is released from the braking operation, all the lamps 641 recover to non-illumination status. Afterwards, when the vehicle is making left turn, a portion of the lamps 641 brighten orange light to show the turning degree of the car. Likewise, referring to FIG. 7B, a right turn process is shown. By viewing the numbers of the brightening lamps on the rear wing 71, the rear drivers can monitor the movement of the front car. FIG. 7C shows the situation similar to FIG. 7B except that the lamps are mounted on the up door spoiler module 72.

Aside from directly using the lamps of an auxiliary braking light in the vehicular turning indicator of the present invention, the lamps of the vehicular turning indicator can also be additionally provided and incorporated into the auxiliary brake light. The lamps 643, for example, can be arranged below (or above) the lamps of the auxiliary brake light 73, as shown in FIG. 8. By this way, both the braking indication and the turning degree indication can be performed at the same time.

Figure 9:
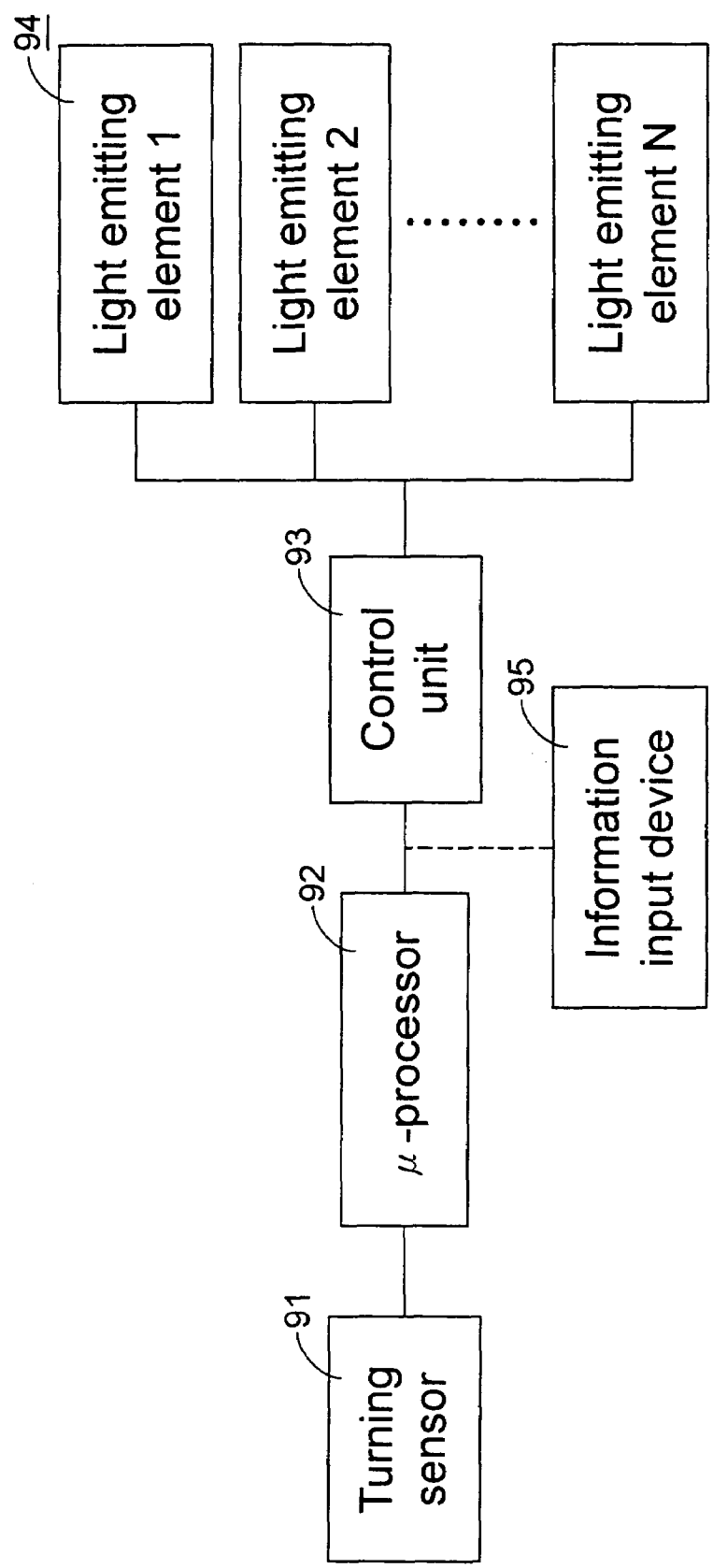
FIG. 9 is a block diagram showing a vehicular turning indicator according to another embodiment of the present invention.

Please refer to FIG. 9 which shows a third embodiment of the vehicular turning indicator according to the present invention. In this embodiment, the vehicular turning indicator is incorporated into a head-up display, which is generally projected on the front windscreen of the vehicle. The vehicular turning indicator shown in FIG. 9 includes a turning sensor 91, a micro-processor 92, a control unit 93 and a series of light-emitting elements 94 intercommunicated as shown. The control unit 93 is optionally in communication with an information input device 95. It is to be noted that the connecting lines among these devices as shown do not indicate the connection of these devices essentially by wires or cables. Alternatively, they can communicate with one another via a vehicular digital bus such as a controller area network (CAN) or vehicle area network (VAN) bus. The sensor 91, like the sensor 21, can be a 9850 Gen II Series sensor or an NCAPS® Thin Profile sensor, which is mounted to a steering wheel (not shown) of the vehicle for detecting a rotation degree of the steering wheel, and outputting a digital signal indicative of the turning direction and the turning angle according to the rotation degree of the steering wheel.

Figure 10:
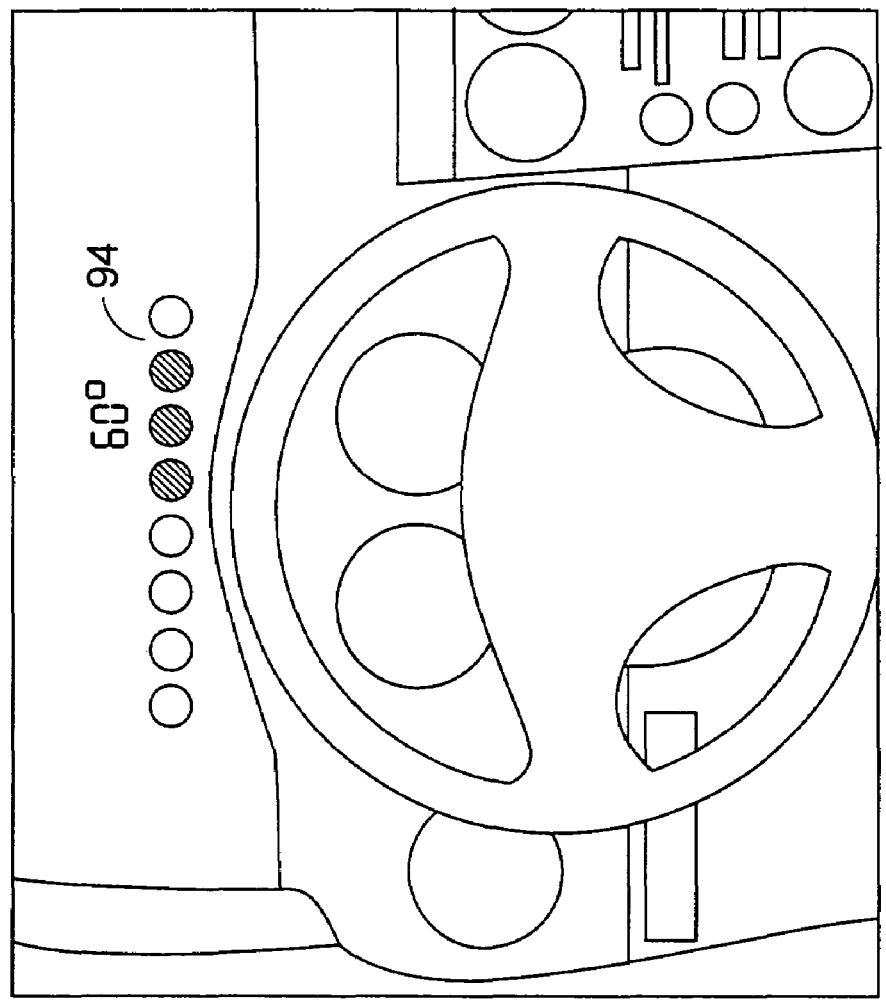
FIG. 10 is a schematic diagram exemplifying the arrangement of the vehicular turning indicator of FIG. 9 in the head-up display module and visible on the windscreen of the vehicle.

The light-emitting elements 94 are parts of a head-up display, and vary with the kinds of head-up displays. For example, the light-emitting elements 94 will be fluorescent tubes when the head-up display is a vacuum fluorescent display (VFD). Alternatively, the head-up display can also be a digital light processor (DLP) display, a liquid crystal on silicon (LCOS) display, a thin film transistor liquid crystal display (TFTLCD) or a transparent liquid crystal display (transparent LCD), and has corresponding light-emitting elements 94. If the light-emitting elements 94 are additionally provided in the head-up display, and specifically used for showing the turning degree of the vehicle, the control unit 93 does not have to communicate with the information input device. When the control unit 93 receives a digital signal from the sensor 91 to indicate a turning-right operation of the vehicle, the micro-processor 92 determines how many and what ones of the light-emitting elements 94 at the right side should be actuated to brighten in response to the digital signal in connection with the turning direction and turning degree. Then, the control unit 93 variably actuates the light-emitting elements 94 of the vehicular turning indicators to show the desired pattern determined by the micro-processor 92, as exemplified in FIG. 10. On the display, the turning degree, e.g. 60°, is preferably simultaneously shown.

Alternatively, the light-emitting elements 94 can be parts of the existent light-emitting elements. Under this circumstance, it is preferred that the control unit 93 is further in communication with the information input device 95. When there is information to be shown on the display, the control unit 93 controls the light-emitting elements 94 to cooperate with other light-emitting elements to show the information. When there is no information to be displayed, the light-emitting elements 94 are used to show the turning degree as described above.

Figure 11:
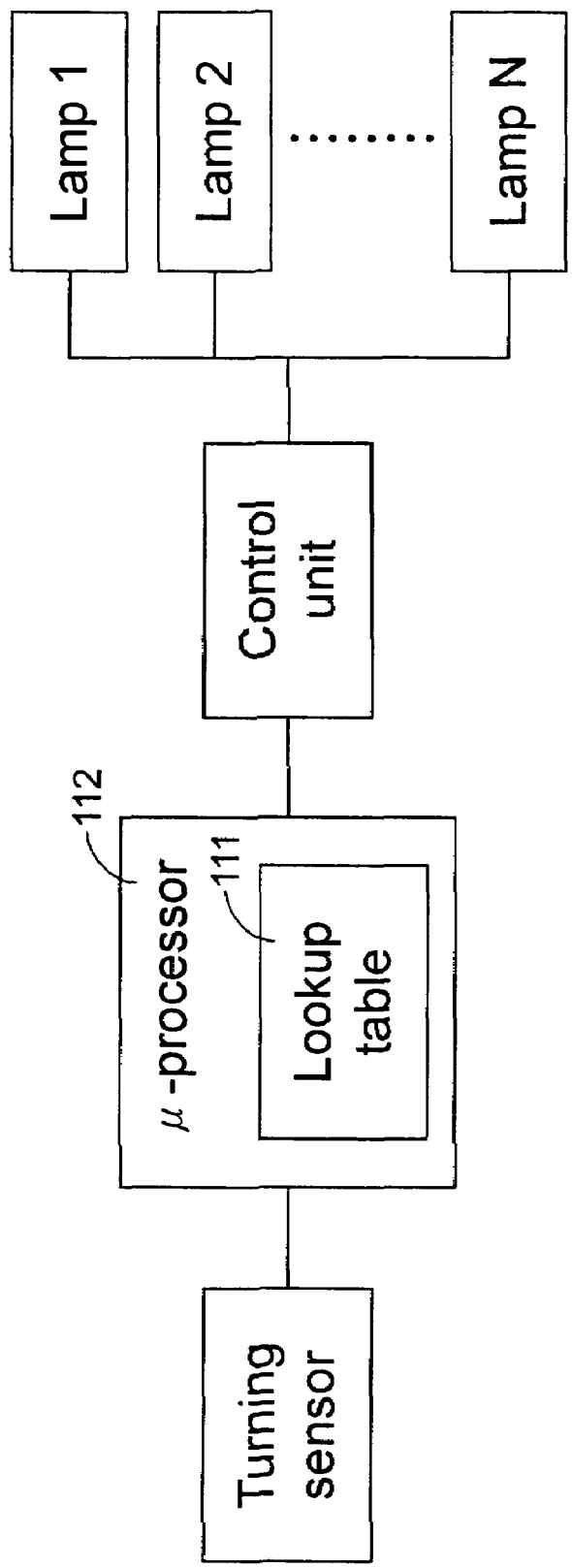
FIG. 11 is a block diagram showing a vehicular turning indicator according to another embodiment of the present invention.

According to another aspect of the present invention, the microprocessor determines how many and what ones of the lamps should be turned on according to a turning direction, a turning angle and a speed of the vehicle. It is assumed that a first pattern is shown at a first speed, and a second pattern is shown at a second speed. If the turning direction and the turning angle are the same and the first speed is higher than the second speed, then the first pattern consists of more brightening lamps than the second pattern does. In the fourth embodiment according to the present invention, a lookup table 111 is built in the microprocessor 112, as shown in FIG. 11, for realizing how many and what ones of the lamps should be turned on. The table shown in FIG. 12A illustrates a simplified lookup table, in which only the number of the lamps to be turned on is illustrated.

The lamps 641 as shown in FIG. 7A are used for describing the lookup table. There are twelve lamps to selectively brighten according to the turning direction, turning degree and speed of the vehicle. Referring to the lookup table of FIG. 12A, when the vehicle is moving at a constant speed, the larger degrees of a turn, the larger number of turned-on lamps. For example, when the velocity is 60 km/hr, two lamps at the right side are turned on for a 5-degree right turn (+5°), three lamps at the right side are turned on for a 15-degree right turn (+15°), and five lamps at the right side are turned on for a 60-degree right turn (+60°). On the other hand, when the vehicle is moving straightforward, no lamp is brightening, i.e. number "0", for any of the velocity 0, 20, 60, 90 or above. When the vehicle is making slight right turn (+5°) or left turn (−5°) under a motionless state, there is still no lamp turned on. However, once the vehicle is making slight right turn (+5°) or left turn (−5°) under a moving state, the number of lamps to brighten varies with the velocity. It is because even slight turn will result in a significant effect when the vehicle is moving with high speed. For example, when the velocity of the vehicle is 20 km/hr, only one lamp at the right side is turned on to indicate the slight right turn (+5°), while three lamps at the right side are turned on to prominently warn others when the velocity of the vehicle is 90 km/hr.

Figure 12B:
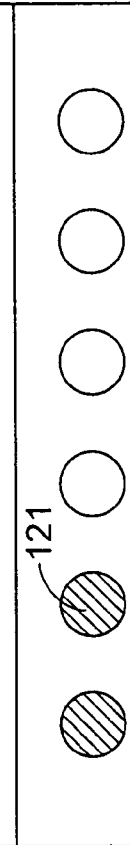
FIG. 12B is an operational example of the vehicular turning indicator of FIG. 11 on the basis of the lookup table of FIG. 12A.

In the above embodiment, more lamps are turned on for higher speed, as indicated by the lookup table of FIG. 12A. Alternatively, the same number of lamps can be turned on for different speeds, but the brightening lamps are different. An example is shown in FIG. 12B. For higher speed, the end brightening lamp 121 is closer to the turning direction, i.e. right direction in this example. Furthermore, the luminance of the brightening lamps may vary with vehicle speed, i.e. the lamps are brighter for higher speed, in order to enhance the warning effect.

The above method for determining the number of brightening lamps depending on both of the turning degree and speed of a vehicle can be applied to any of the above embodiments by providing proper lookup tables. The lookup tables are designed on the basis of the turning angles, velocities and total numbers of turning indicator lamps.

Figure 13:
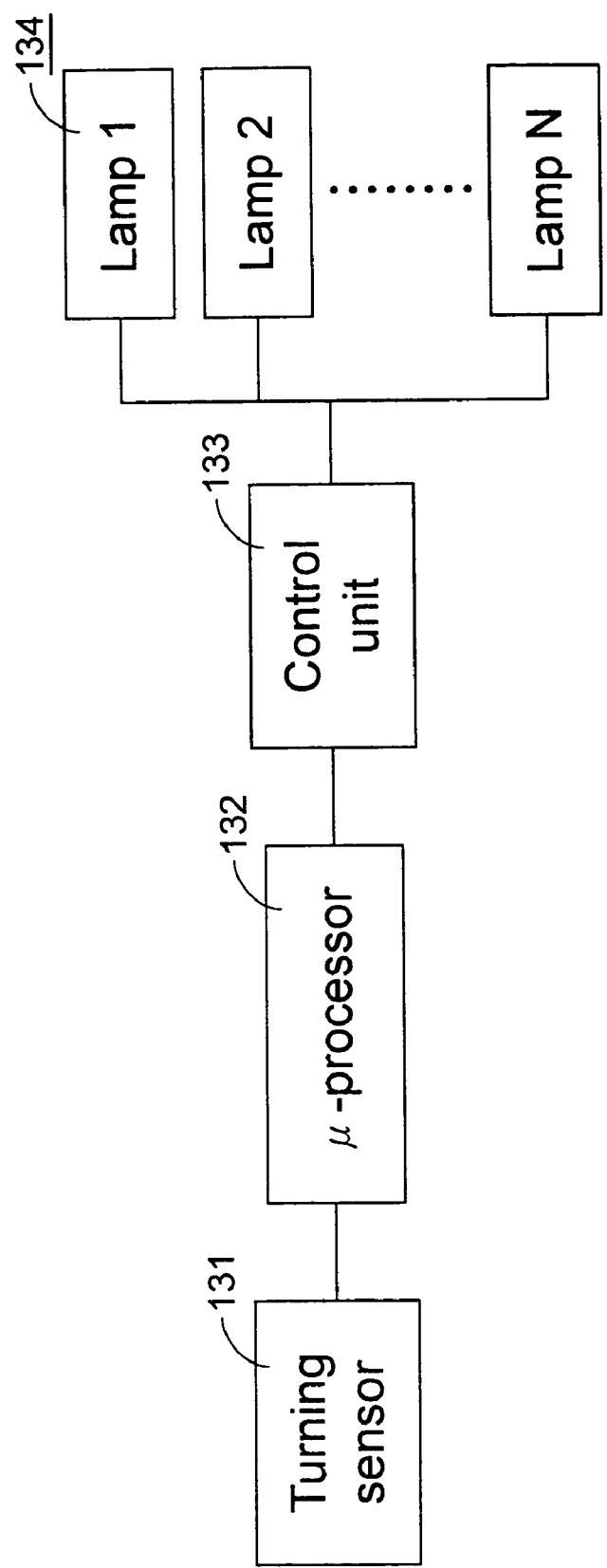
FIG. 13 is a block diagram showing a vehicular turning indicator according to another embodiment of the present invention.

According to another aspect of the present invention, the vehicular turning indicator can be additionally and independently designed instead of being implemented by or incorporated into currently existent vehicular lamps such as an indicator light, a brake light or a head-up display. The vehicular turning indicator includes a turning sensor 131, a micro-processor 132, a control unit 133 and a series of lamps 134 intercommunicated as shown in FIG. 13. It is to be noted that the connecting lines among these devices as shown do not indicate the connection of these devices essentially by wires or cables. Alternatively, they can communicate with one another via a vehicular digital bus such as a controller area network (CAN) or vehicle area network (VAN) bus. The sensor 131 is mounted to a steering wheel (not shown) of the vehicle for detecting a rotation degree of the steering wheel, and outputting a digital signal indicative of the turning direction and the turning angle according to the rotation degree of the steering wheel. A commercial sensor, such as a 9850 Gen II Series sensor or an NCAPS® Thin Profile sensor commercially available from BEI Technologies Inc. (California, USA), can be applied hereto to achieve the above purpose. When a digital signal is outputted by the sensor 131 to indicate a turning-right operation of the vehicle, the micro-processor 132 determines how many and what ones of the lamps at the right side should be turned on in response to the digital signal in connection with the turning direction, turning degree and preferably speed of the vehicle. Then, the control unit 133 variably turns on the lamps of the right vehicular turning indicators to show the desired pattern determined by the micro-processor 132.

Figure 14A:
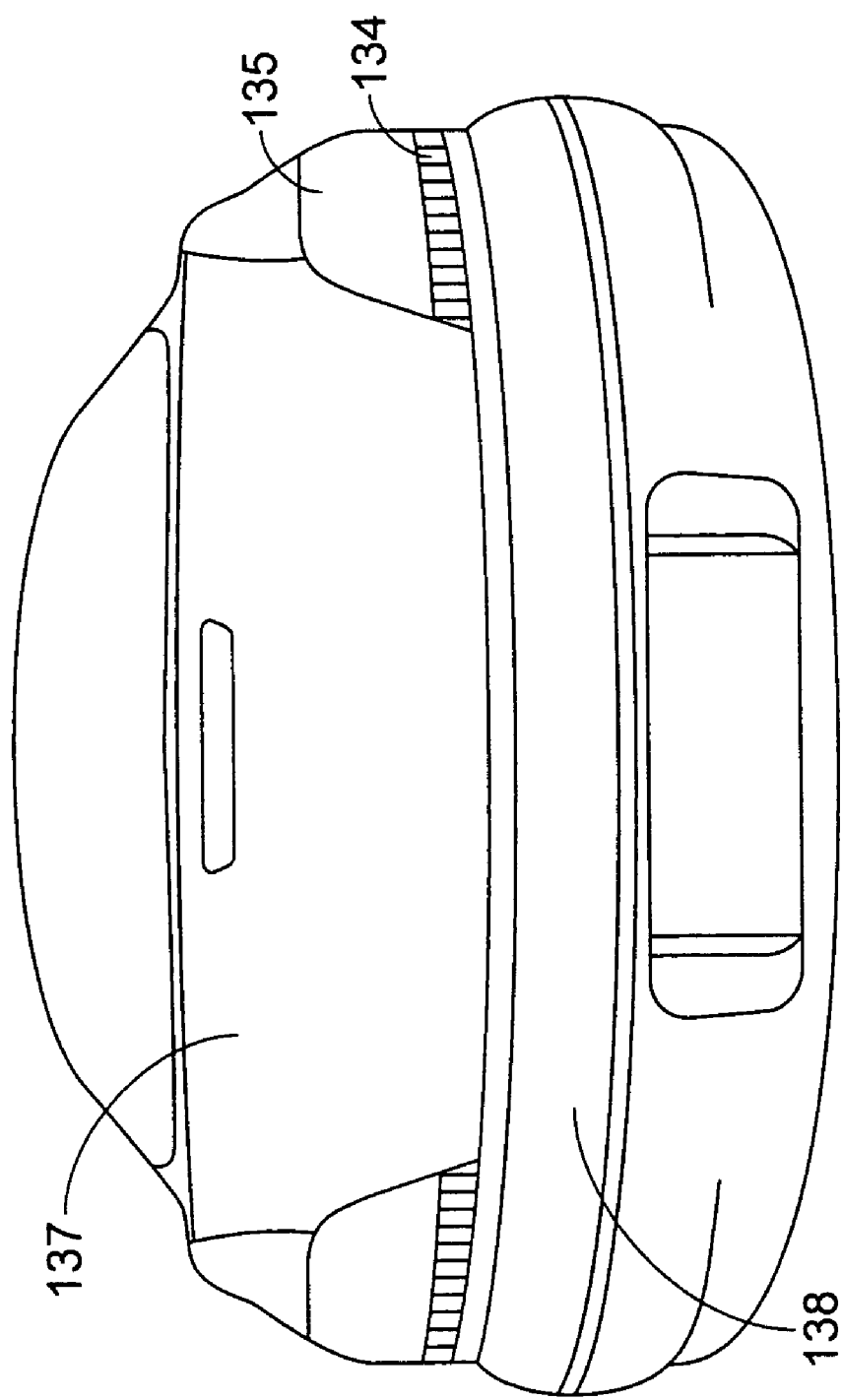
FIGS. 14A~14C are schematic diagrams exemplifying the arrangement of the vehicular turning indicator of FIG. 13 on various positions of the vehicle.
Figure 14B:
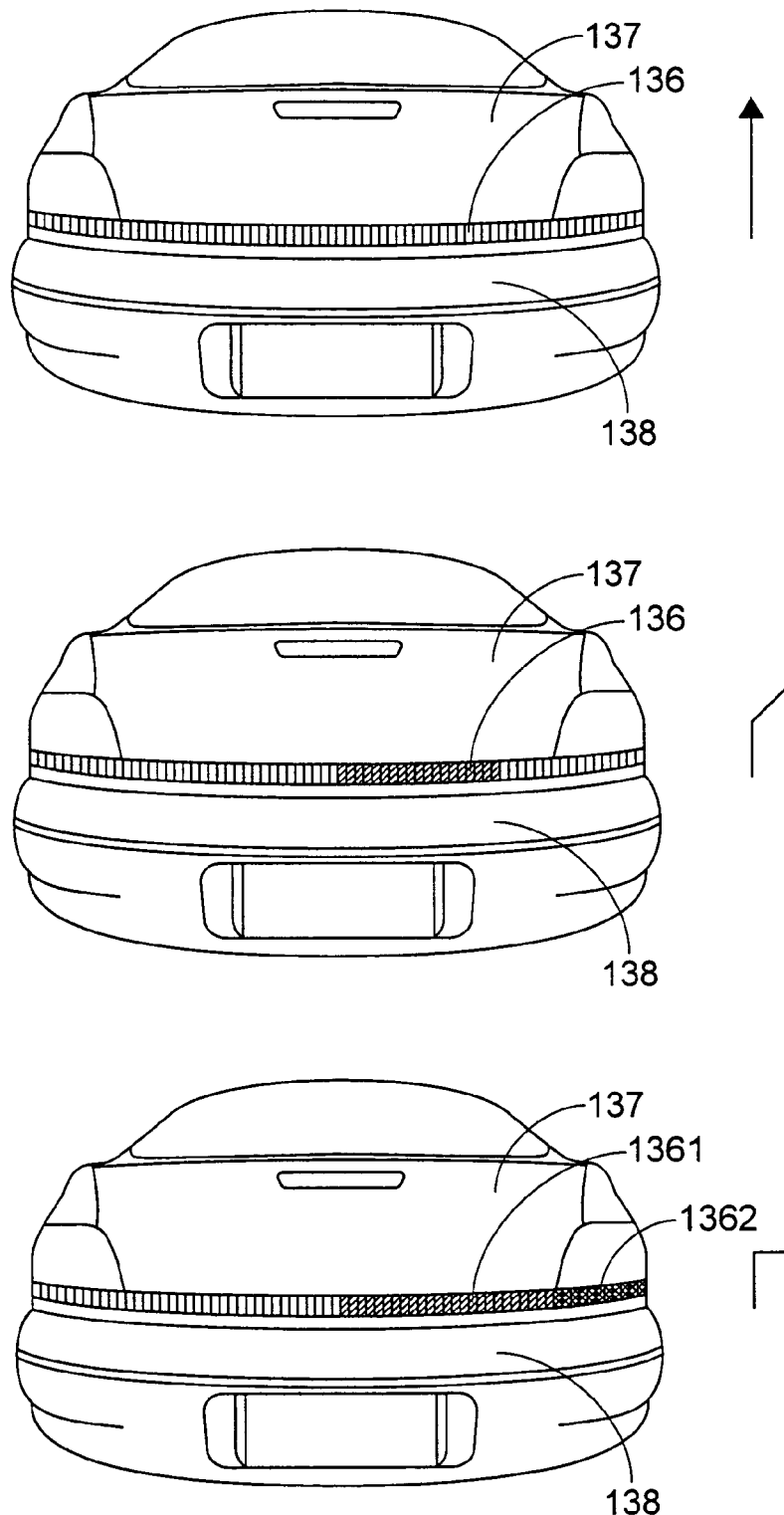
Figure 14C:
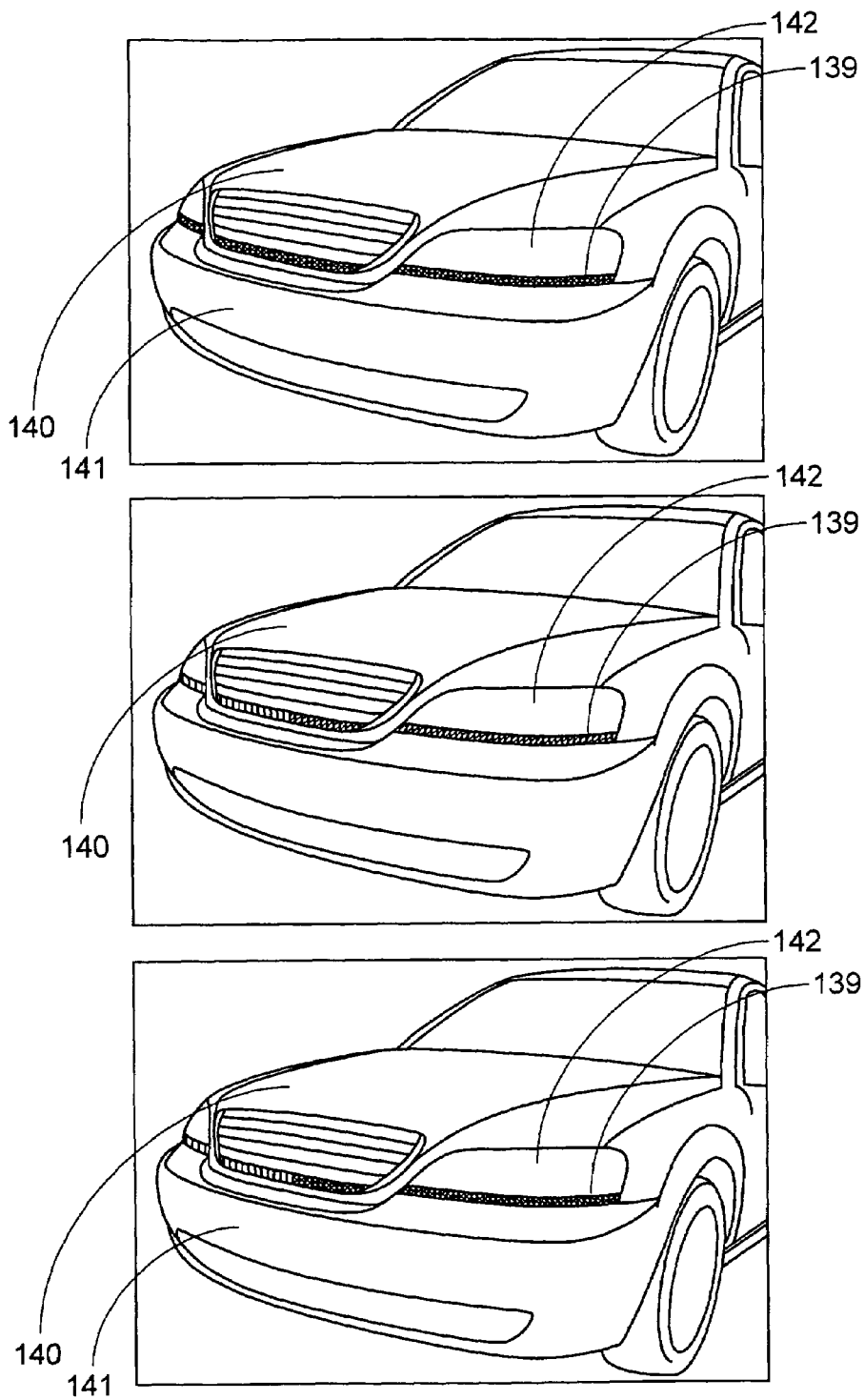

For example, the lamps 134 can be arranged on the body of the vehicle under a lamp assembly 135 comprising an indicator light, a backup light and a brake light, as shown in FIG. 14A. In another example, the lamps 136 are arranged on the body of the vehicle between the trunk door 137 and the rear bumper 138, as shown in FIG. 14B. Preferably, the lamps 136 consist of more than one color to distinguish different levels of turn so as to make the turning indication even prominent. For example, for the right portion of lamps in connection with the right turn indication, the left ⅔ portion 1361 of lamps brighten orange light and the right ⅓ portion 1362 of lamps brighten red light to inform other drivers of a sharp turn. The lamps, of course, can be mounted to any other suitable place as long as they can hold attraction from other drivers. For example, the lamps can also be arranged on the body of the vehicle between the door of the engine room 140 and the front bumper 141 and/or arranged under the headlight lamps 142, as shown in FIG. 14C.

As have mentioned above, the lamps may emit different colors of light for different functions. For example, the color of light emitted in response to the operation of an indicator light switch or a brake operation can be different from that emitted in response to the turning angle. In order to hold attraction from other drivers, the colors of light emitted in response to different turning angles can be different as described above with reference to FIG. 14B. Alternatively, the colors of light may vary with turning angles in a manner as shown in FIG. 14C. For example, when the lamps 139 are used to show the brake operation, as in Case I, the color of light is red. When the lamps 139 are used to show the small degree of turning operation, the color of light is yellow, as in Case II. When the lamps 139 are used to show the large degree of turning operation, the color of light becomes red again, as in Case III.

In addition to color, the luminance of the light can also vary with the turning degree and/or speed of the vehicle.

Figure 15A:
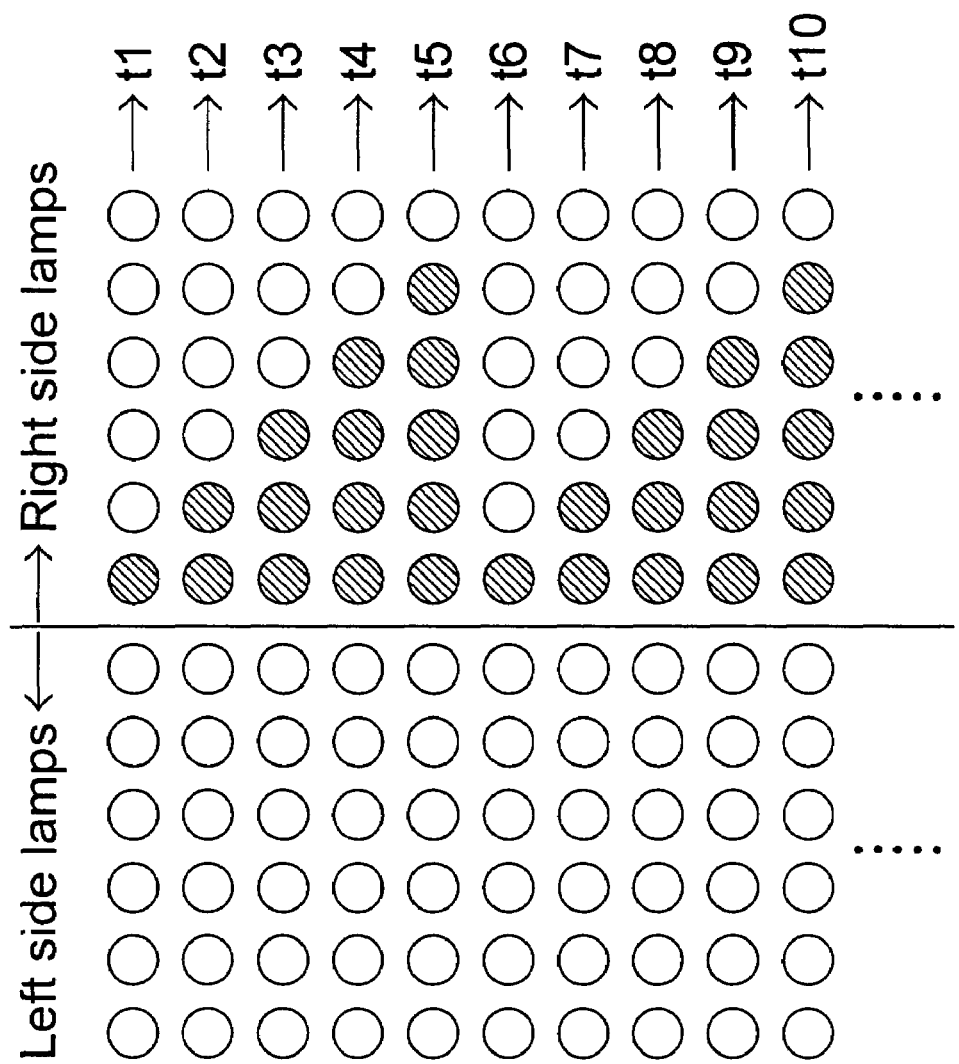
Figure 15C:
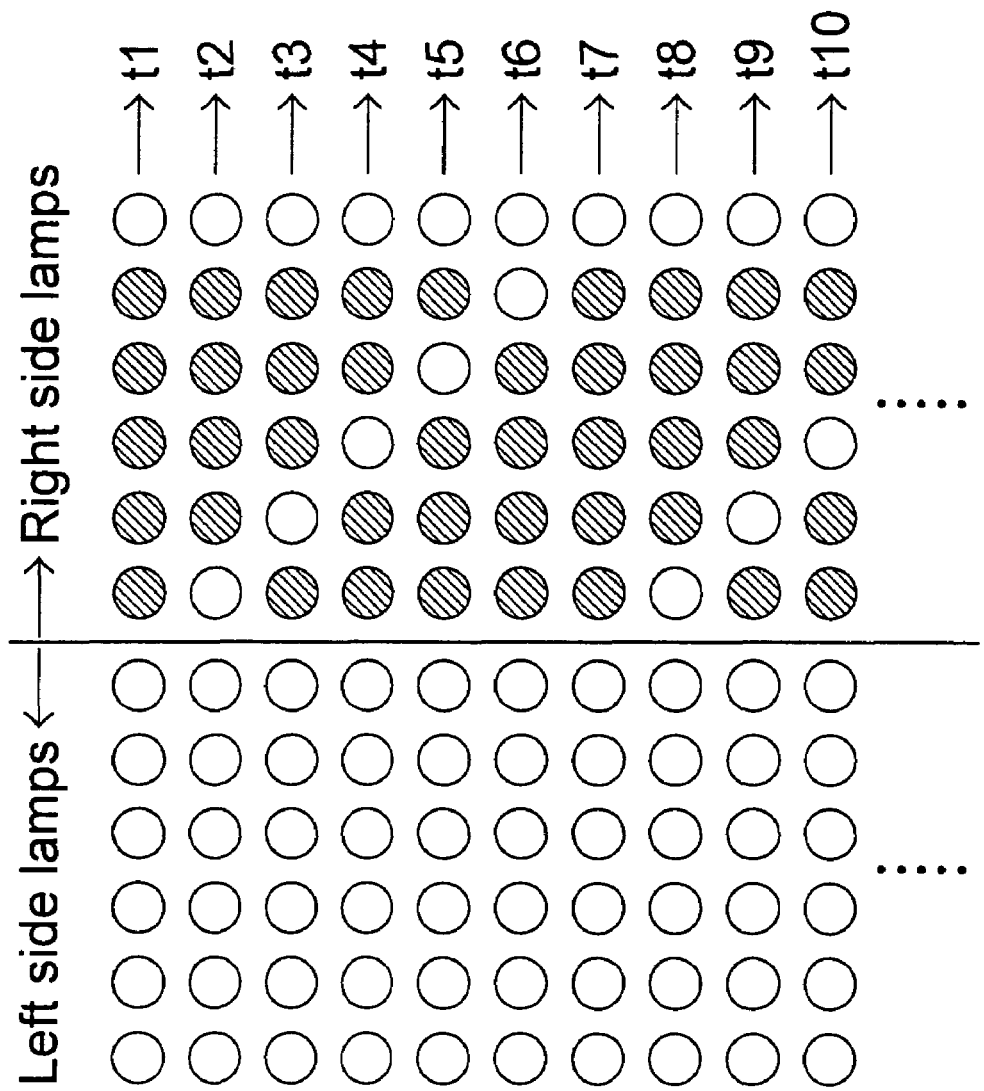
Figure 15D:
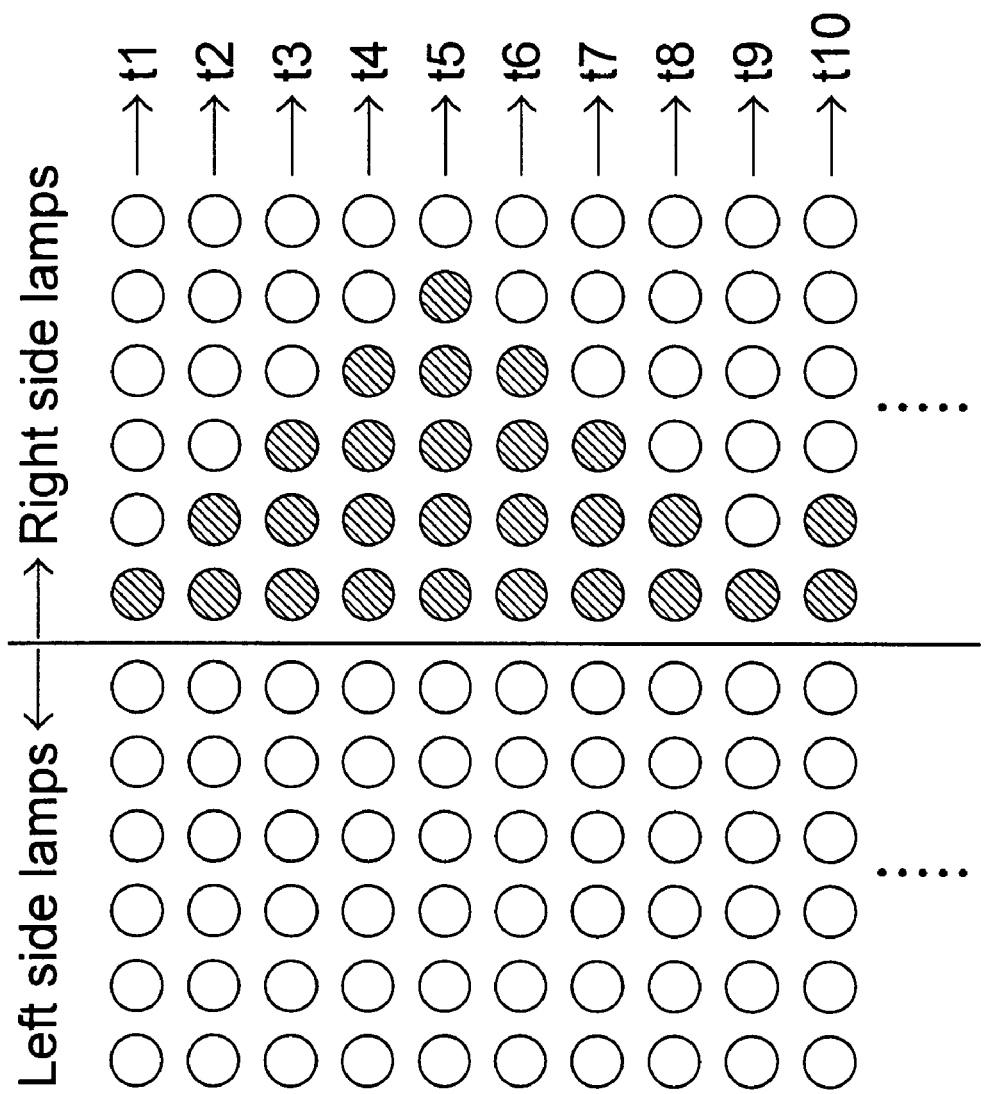
Figure 16:
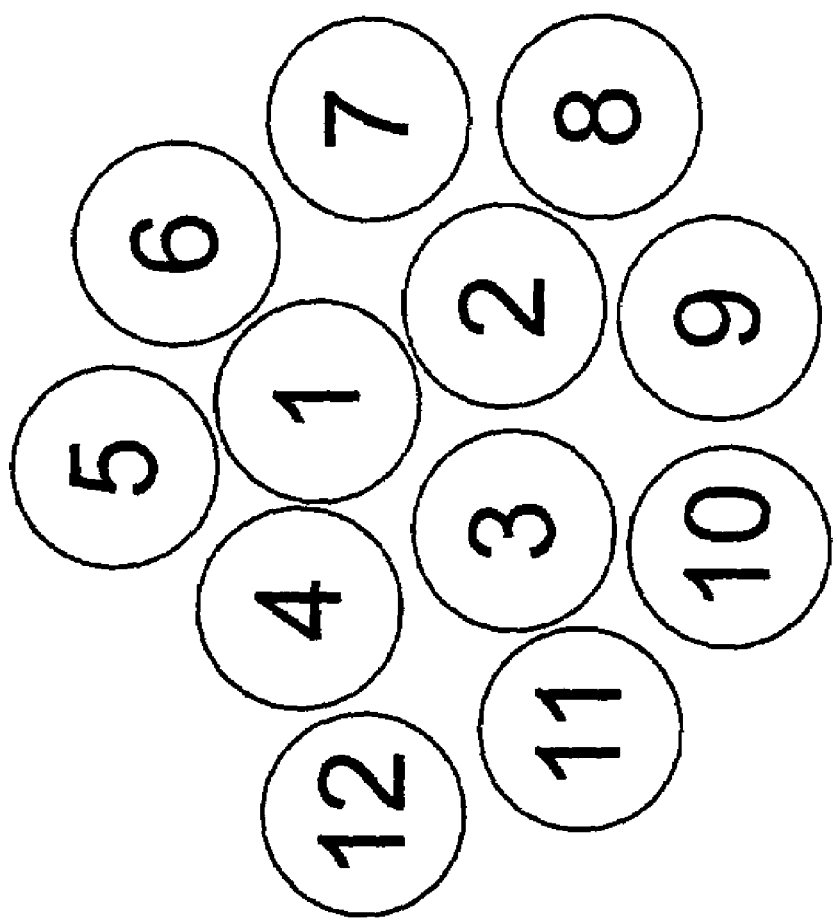
FIG. 16 is a schematic diagram exemplifying another lamp pattern shown by the vehicular turning indicator of FIG. 13.

In order to further hold attraction from other drivers, a plurality of patterns can be sequentially shown for a specific turning direction and a specific turning angle. For example, the lamps of any of the above embodiments can be made to sequentially twinkle. The transformation of the plurality of patterns or the twinkling action of the lamps preferably follows a predetermined rule. It is assumed that the vehicle is making a right turn at an angle of 60 degrees under a velocity of 60 km/hr. According to the lookup table of FIG. 12, five lamps at the right side should be turned on. In this embodiment, the five lamps sequentially twinkle instead of staying unchanged. FIGS. 15A~15D illustrate four examples of the sequentially twinkling action under the maximum number determined according to the turning direction, turning degree and/or vehicular speed. Referring to the above example again, the maximum number of the lamps to brighten is five when the vehicle is making a right turn at an angle of 60 degrees under a velocity of 60 km/hr. In other words, in either of the embodiments shown in FIGS. 15A~15D, five lamps are possibly brightening, and each of the five lamps twinkles, i.e. brightens and then darkens, according to a predetermined manner as shown. In the embodiment of FIG. 15A, only the leftmost one lamp is brightening at the time point t1. Then, the leftmost two lamps are brightening at the time point t2. Likewise, one rightward lamp is additionally brightening at a time as time goes by. When the maximum number "5" is reached, the above-mentioned procedures start over. That is, the rightmost four lamps among the designated five lamps darken, while only the leftmost lamp brightens. In the embodiment of FIG. 15B, the leftmost two lamps brighten at the time point t1. Then, at the time point t2, the left one of the leftmost two lamps darkens, and another lamp next to the still brightening lamp is turned on. In other words, there remains two brightening lamps. The two lamps, however, "run" rightwards. Likewise, one left lamp darkens and one rightward lamp additionally brightens at a time as time goes by. After the leftmost fifth lamp brightens, the above-mentioned procedures start over. In other words, the leftmost two lamps brighten again. In the embodiment of FIG. 15C, the maximum number of lamps, i.e. five lamps, are brightening at first. Then, the lamps darken one by one from left to right. When the right-side lamp darkens, the left-side lamp re-illuminates. The embodiment of FIG. 15D is similar to that of FIG. 15A from the time point t1 to the time point t5. At the time point t6, the rightmost one among the five lamps darkens. Likewise, one leftward lamp is additionally darkening at a time as time goes by. The above procedures as executed from t1 to t8 start over when only one lamp is left brightening. The twinkle rate is up to a high rate and preferably depends on the speed of the vehicle so that people will see the lamps running, thereby holding people's attraction. For example, the time interval t for changing patterns, where t=t2−t1=t3−t2=...=t10−t9=..., is 0.5 second for 20 km/hr speed, but the time interval t is reduced to 0.25 second for 60 km/hr speed. Although a linear lamp shape is exemplified for illustrating the twinkle action of the lamps, the twinkle principal may be applied to various lamp shapes by those skilled in the art. For example, for a helix lamp assembly, as shown in FIG. 16, the brightening modes shown in FIGS. 15A~15D can also be applied here. The numbers labeled inside the lamps indicate the brightening sequence of the lamps.

The present invention provides various vehicular turning indicators capable of automatically show the turning degree of a vehicle. The vehicular turning indicator can be implemented by currently existent vehicular lamps, be incorporated into an existent vehicular accessory, utilize special flashing effects to make the turning indication prominent, allow the driver himself to see the turning indication, and/or operate depending on the speed of the vehicle. By the present vehicular turning indicators, the movement of the vehicle can be monitored so as to enhance the driving safety.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A vehicular turning indicator for automatically showing a turning degree of a vehicle, comprising:
a sensor sensing a turning angle of the vehicle;
a control device asserting a first control signal in response to an ON state of an indicator light switch and asserting a second control signal according to said turning angle; and
a plurality of lightening units in communication with said control device, selectively brightening to constitute a constant pattern in response to said first control signal, and selectively brightening to constitute a variable pattern in response to said second control signal.

2. The vehicular turning indicator according to claim 1 wherein said sensor is mounted to a steering wheel of said vehicle for detecting a rotation degree of said steering wheel, and outputting a digital signal indicative of said turning angle according to said rotation degree of said steering wheel.

3. The vehicular turning indicator according to claim 1 wherein said control device comprises:
a micro-processor in communication with said sensor, determining what pattern is to be shown according to said turning angle; and
a control unit in communication with said micro-processor, said indicator light switch and said plurality of lightening units, asserting said first control signal to turn on a first selected number of said lightening units when said indicator light switch is in said ON state, and asserting said second control signal to turn on a second selected number of said lightening units when said indicator light switch is in an OFF state, thereby showing the desired pattern determined by said micro-processor.

4. The vehicular turning indicator according to claim 3 wherein said first selected number of said lightening units alternately brighten for a first period and darken for a second period in response to said first control signal, and said control unit further asserts said second control signal during said second period when said indicator light switch is in said ON state.

5. The vehicular turning indicator according to claim 1 wherein said control device comprises:
a micro-processor in communication with said sensor, determining what pattern is to be shown according to said turning angle; and
a control unit in communication with said micro-processor, said indicator light switch and said plurality of lightening units, asserting said first control signal to turn on a first selected number of said lightening units for a first period and turn off said first selected number of said lightening units for a second period when said indicator light switch is in said ON state, and asserting said second control signal to turn on a second selected number of said lightening units during said second period when said indicator light switch is in said ON state, thereby showing the desired pattern determined by said micro-processor.

6. The vehicular turning indicator according to claim 1 wherein all of said plurality of lightening units brighten in response to said first control signal to constitute said constant pattern.

7. The vehicular turning indicator according to claim 1 wherein a portion of said plurality of lightening units brighten in response to said first control signal to constitute said constant pattern.

8. The vehicular turning indicator according to claim 1 wherein said lightening units to brighten in response to said second control signal are determined according to a lookup table.

9. The vehicular turning indicator according to claim 1 wherein said control device asserts said second control signal according to said turning angle and a speed of said vehicle.

10. The vehicular turning indicator according to claim 9 wherein a first pattern is formed by turning on a first number of said lightening units in response to said second control signal at a certain turning direction, a certain turning angle and a first speed of said vehicle, and a second pattern is formed by turning on a second number of said lightening units in response to said second control signal at said certain turning direction, said certain turning angle and a second speed of said vehicle, and said first number is different from said second number if said first speed is different from said second speed.

11. The vehicular turning indicator according to claim 10 wherein said first number is greater than said second number if said first speed is higher than said second speed.

12. The vehicular turning indicator according to claim 9 wherein a first pattern is shown in response to said second control signal at a certain turning direction, a certain turning angle and a first speed of said vehicle, and a second pattern is shown in response to said second control signal at said certain turning direction, said certain turning angle and a second speed of said vehicle, and an end lightening unit that brightens in said first pattern is closer to said turning direction than an end lightening unit that brightens in said second pattern is if said first speed is higher than said second speed.

13. The vehicular turning indicator according to claim 9 wherein the luminance of said lightening units brightening in response to said second control signal varies with said speed of said vehicle.

14. The vehicular turning indicator according to claim 9 wherein the luminance of said lightening units brightening in response to said second control signal increases with said speed of said vehicle.

15. The vehicular turning indicator according to claim 9 wherein the color of said lightening units brightening in response to said second control signal varies with said speed of said vehicle.

16. The vehicular turning indicator according to claim 1 wherein the color of said lightening units brightening in response to said second control signal varies with said turning degree of said vehicle.

17. The vehicular turning indicator according to claim 1 wherein the luminance of said lightening units brightening in response to said second control signal varies with said turning degree of said vehicle.

18. The vehicular turning indicator according to claim 1 wherein a plurality of patterns are sequentially shown in response to said second control signal for a specific turning angle, and the transformation of said plurality of patterns follows a predetermined rule.

19. The vehicular turning indicator according to claim 18 wherein a transformation rate of said plurality of patterns varies with a speed of said vehicle.

20. The vehicular turning indicator according to claim 18 wherein a transformation rate of said plurality of patterns increases with a speed of said vehicle.

21. The vehicular turning indicator according to claim 1 wherein said plurality of lightening units are arranged in a linear manner.

22. The vehicular turning indicator according to claim 1 wherein said plurality of lightening units are arranged in a concentric manner.

23. The vehicular turning indicator according to claim 1 wherein said plurality of lightening units are arranged in a helix manner.

24. The vehicular turning indicator according to claim 1 wherein said plurality of lightening units are filament lamps, bulbs, light emitting diodes (LEDs), electro luminescence (EL) segments or fluorescent tubes.

25. The vehicular turning indicator according to claim 1 wherein said plurality of lightening units are multi-color lightening units showing a first color in response to said first control signal, and showing a second color different from said first color in response to said second control signal.

26. The vehicular turning indicator according to claim 1 wherein said plurality of lightening units are disposed on the body of said vehicle.

27. The vehicular turning indicator according to claim 1 wherein said plurality of lightening units are disposed in said interior rearview mirror module.

28. The vehicular turning indicator according to claim 1 wherein said plurality of lightening units are disposed in said exterior rearview mirror module.

29. The vehicular turning indicator according to claim 1 wherein said plurality of lightening units are disposed on the housing of said exterior rearview mirror module.

30. A vehicular turning indicator for automatically showing a turning direction and a turning degree of a vehicle, comprising:

a sensor sensing a turning angle of the vehicle;

a control device asserting a first control signal in response to a brake operation and asserting a second control signal according to said turning angle; and a plurality of lightening units in communication with said control device, selectively brightening to constitute a constant pattern in response to said first control signal, and selectively brightening to constitute a variable pattern in response to said second control signal.

31. The vehicular turning indicator according to claim 30 wherein said sensor is mounted to a steering wheel of said vehicle for detecting a rotation degree of said steering wheel, and outputting a digital signal indicative of said turning angle according to said rotation degree of said steering wheel.

32. The vehicular turning indicator according to claim 30 wherein said control device comprises:

a micro-processor in communication with said sensor, determining what pattern is to be shown according to said turning angle; and a control unit in communication with said micro-processor, a brake sensor and said plurality of lightening units, asserting said first control signal to turn on a first selected number of lightening units when said brake operation is performed, and asserting said second control signal to turn on a second selected number of lightening units when said brake operation is not performed, thereby showing the desired pattern determined by said micro-processor.

33. The vehicular turning indicator according to claim 32 wherein said first selected number of said lightening units alternately brighten for a first period and darken for a second period in response to said first control signal, and said control unit further asserts said second control signal during said second period when said brake operation is performed.

34. The vehicular turning indicator according to claim 30 wherein said control device comprises:

a micro-processor in communication with said sensor, determining what pattern is to be shown according to said turning angle; and a control unit in communication with said micro-processor, a brake sensor and said plurality of lightening units, asserting said first control signal to turn on a first selected number of said lightening units for a first period and turn off said first selected number of said lightening units for a second period when a brake operation is performed, and asserting said second control signal to turn on a second selected number of said lightening units during said second period when said brake operation is performed, thereby showing the desired pattern determined by said micro-processor.

35. The vehicular turning indicator according to claim 30 wherein all of said plurality of lightening units brighten in response to said first control signal to constitute said constant pattern.

36. The vehicular turning indicator according to claim 30 wherein a portion of said plurality of lightening units brighten in response to said first control signal to constitute said constant pattern.

37. The vehicular turning indicator according to claim 30 wherein said lightening units to brighten in response to said second control signal are determined according to a lookup table.

38. The vehicular turning indicator according to claim 30 wherein said control device asserts said second control signal according to said turning angle and a speed of said vehicle.

39. The vehicular turning indicator according to claim 38 wherein a first pattern is formed by turning on a first number of said lightening units in response to said second control signal at a certain turning direction, a certain turning angle and a first speed of said vehicle, and a second pattern is formed by turning on a second number of said lightening units in response to said second control signal at said certain turning direction, said certain turning angle and a second speed of said vehicle, and said first number is different from said second number if said first speed is different from said second speed.

40. The vehicular turning indicator according to claim 39 wherein said first number is greater than said second number if said first speed is higher than said second speed.

41. The vehicular turning indicator according to claim 38 wherein a first pattern is shown in response to said second control signal at a certain turning direction, a certain turning angle and a first speed of said vehicle, and a second pattern is shown in response to said second control signal at said certain turning direction, said certain turning angle and a second speed of said vehicle, and an end lightening unit that brightens in said first pattern is closer to said turning direction than an end lightening unit that brightens in said second pattern is if said first speed is higher than said second speed.

42. The vehicular turning indicator according to claim 38 wherein the luminance of said lightening units brightening in response to said second control signal varies with said speed of said vehicle.

43. The vehicular turning indicator according to claim 38 wherein the luminance of said lightening units brightening in response to said second control signal increases with said speed of said vehicle.

44. The vehicular turning indicator according to claim 38 wherein the color of said lightening units brightening in response to said second control signal varies with said speed of said vehicle.

45. The vehicular turning indicator according to claim 30 wherein the color of said lightening units brightening in response to said second control signal varies with said turning degree of said vehicle.

46. The vehicular turning indicator according to claim 30 wherein the luminance of said lightening units brightening in response to said second control signal varies with said turning degree of said vehicle.

47. The vehicular turning indicator according to claim 30 wherein a plurality of patterns are, sequentially shown in response to said second control signal for a specific turning angle, and the transformation of said plurality of patterns follows a predetermined rule.

48. The vehicular turning indicator according to claim 47 wherein a transformation rate of said plurality of patterns varies with a speed of said vehicle.

49. The vehicular turning indicator according to claim 47 wherein a transformation rate of said plurality of patterns increases with a speed of said vehicle.

50. The vehicular turning indicator according to claim 30 wherein said plurality of lightening units are arranged in a linear manner, a concentric manner or a helix manner.

51. The vehicular turning indicator according to claim 30 wherein said plurality of lightening units are filament lamps, bulbs, light emitting diodes (LEDs), electro luminescence (EL) segments or fluorescent tubes.

52. The vehicular turning indicator according to claim 30 wherein said plurality of lightening units are multi-color lightening units showing a first color in response to said first control signal, and showing a second color different from said first color in response to said second control signal.

53. The vehicular turning indicator according to claim 30 wherein said plurality of lightening units are disposed on the body of said vehicle.

54. The vehicular turning indicator according to claim 30 wherein said plurality of lightening units are disposed on rear spoiler of said vehicle.

55. The vehicular turning indicator according to claim 30 wherein said plurality of lightening units are disposed adjacent to the rear windscreen inside said vehicle.

56. A vehicular turning indicator for automatically showing a turning degree of a vehicle, comprising:
   a sensor sensing a turning angle of the vehicle;
   a control device asserting a control signal according to said turning angle and a speed of said vehicle; and
   a plurality of lightening units in communication with said control device, integrated into a rearview mirror module and selectively brightening to constitute a variable pattern in response to said control signal;
   wherein a first pattern is shown in response to said control signal at a certain turning direction, a certain turning angle and a first speed of said vehicle, and a second pattern is shown in response to said control signal at said certain turning direction, said certain turning angle and a second speed of said vehicle, and an end lightening unit that brightens in said first pattern is closer to said turning direction than an end lightening unit that brightens in said second pattern is if said first speed is higher than said second speed.

57. The vehicular turning indicator according to claim 56 wherein said sensor is mounted to a steering wheel of said vehicle for detecting a rotation degree of said steering wheel, and outputting a digital signal indicative of said turning angle according to said rotation degree of said steering wheel.

58. The vehicular turning indicator according to claim 56 wherein said control device comprises:
   a micro-processor in communication with said sensor, determining what pattern is to be shown according to said turning angle; and
   a control unit in communication with said micro-processor and said plurality of lightening units, asserting said control signal to turn on a selected number of lightening units, thereby showing the desired pattern determined by said micro-processor.

59. The vehicular turning indicator according to claim 56 wherein said lightening units to brighten in response to said control signal are determined according to a lookup table.

60. The vehicular turning indicator according to claim 56 wherein a first pattern is formed by turning on a first number of said lightening units in response to said control signal at a certain turning direction, a certain turning angle and a first speed of said vehicle, and a second pattern is formed by turning on a second number of said lightening units in response to said control signal at said certain turning direction, said certain turning angle and a second speed of said vehicle, and said first number is different from said second number if said first speed is different from said second speed.

61. The vehicular turning indicator according to claim 60 wherein said first number is greater than said second number if said first speed is higher than said second speed.

62. The vehicular turning indicator according to claim 56 wherein the luminance of said lightening units brightening in response to said control signal varies with said speed of said vehicle.

63. The vehicular turning indicator according to claim 56 wherein the luminance of said lightening units brightening in response to said control signal increases with said speed of said vehicle.

64. The vehicular turning indicator according to claim 56 wherein the color of said lightening units brightening in response to said control signal varies with said speed of said vehicle.

65. The vehicular turning indicator according to claim 56 wherein the color of said lightening units brightening in response to said control signal varies with said turning degree of said vehicle.

66. The vehicular turning indicator according to claim 56 wherein the luminance of said lightening units brightening in response to said control signal varies with said turning degree of said vehicle.

67. The vehicular turning indicator according to claim 56 wherein a plurality of patterns are sequentially shown in response to said control signal for a specific turning angle, and the transformation of said plurality of patterns follows a predetermined rule.

68. The vehicular turning indicator according to claim 67 wherein a transformation rate of said plurality of patterns varies with a speed of said vehicle.

69. The vehicular turning indicator according to claim 67 wherein a transformation rate of said plurality of patterns increases with a speed of said vehicle.

70. The vehicular turning indicator according to claim 56 wherein said plurality of lightening units are filament lamps, bulbs, light emitting diodes (LEDs), electro luminescence (EL) segments or fluorescent tubes.

71. The vehicular turning indicator according to claim 56 wherein said plurality of lightening units are disposed in said interior rearview mirror module.

72. The vehicular turning indicator according to claim 56 wherein said plurality of lightening units are disposed in said exterior rearview mirror module.

73. The vehicular turning indicator according to claim 56 wherein said plurality of lightening units are disposed on the housing of said exterior rearview mirror module.

74. A vehicular turning indicator for automatically showing a turning degree of a vehicle, comprising:
　a sensor sensing a turning angle of the vehicle;
　a control device asserting a control signal according to said turning angle and a speed of said vehicle; and
　a first series of lightening units in communication with said control device, integrated into an auxiliary brake light module including a second series of lightening units brightening in response to a brake operation, and selectively brightening to constitute a variable pattern in response to said control signal;
　wherein a first pattern is shown in response to said control signal at a certain turning direction, a certain turning angle and a first speed of said vehicle, and a second pattern is shown in response to said control signal at said certain turning direction, said certain turning angle and a second speed of said vehicle, and an end lightening unit in said first series that brightens in said first pattern is closer to said turning direction than an end lightening unit in said first series that brightens in said second pattern is if said first speed is higher than said second speed.

75. The vehicular turning indicator according to claim 74 wherein said sensor is mounted to a steering wheel of said vehicle for detecting a rotation degree of said steering wheel, and outputting a digital signal indicative of said turning angle according to said rotation degree of said steering wheel.

76. The vehicular turning indicator according to claim 74 wherein said control device comprises:
　a micro-processor in communication with said sensor, determining what pattern is to be shown according to said turning angle; and
　a control unit in communication with said micro-processor and said first series of lightening units, asserting said control signal to turn on a selected number of said first series of lightening units, thereby showing the desired pattern determined by said micro-processor.

77. The vehicular turning indicator according to claim 74 wherein said lightening units in said first series to brighten in response to said control signal are determined according to a lookup table.

78. The vehicular turning indicator according to claim 74 wherein a first pattern is formed by turning on a first number of said lightening units in said first series in response to said control signal at a certain turning direction, a certain turning angle and a first speed of said vehicle, and a second pattern is formed by turning on a second number of said lightening units in said first series in response to said control signal at said certain turning direction, said certain turning angle and a second speed of said vehicle, and said first number is different from said second number if said first speed is different from said second speed.

79. The vehicular turning indicator according to claim 78 wherein said first number is greater than said second number if said first speed is higher than said second speed.

80. The vehicular turning indicator according to claim 74 wherein the luminance of said lightening units in said first series brightening in response to said control signal varies with said speed of said vehicle.

81. The vehicular turning indicator according to claim 74 wherein the luminance of said lightening units in said first series brightening in response to said control signal increases with said speed of said vehicle.

82. The vehicular turning indicator according to claim 74 wherein the color of said lightening units in said first series brightening in response to said control signal varies with said speed of said vehicle.

83. The vehicular turning indicator according to claim 74 wherein the color of said lightening units in said first series brightening in response to said control signal varies with said turning degree of said vehicle.

84. The vehicular turning indicator according to claim 74 wherein the luminance of said lightening units in said first series brightening in response to said control signal varies with said turning degree of said vehicle.

85. The vehicular turning indicator according to claim 74 wherein a plurality of patterns are sequentially shown in response to said control signal for a specific turning angle, and the transformation of said plurality of patterns follows a predetermined rule.

86. The vehicular turning indicator according to claim 85 wherein a transformation rate of said plurality of patterns varies with a speed of said vehicle.

87. The vehicular turning indicator according to claim 85 wherein a transformation rate of said plurality of patterns increases with a speed of said vehicle.

88. The vehicular turning indicator according to claim 74 wherein said first and said second series of lightening units brighten different colors of light.

89. The vehicular turning indicator according to claim 74 wherein said first and said second series of lightening units are disposed on rear spoiler of said vehicle.

90. The vehicular turning indicator according to claim 74 wherein said first and said second series of lightening units are disposed adjacent to the rear windscreen inside said vehicle.

91. A vehicular turning indicator for automatically showing a turning degree of a vehicle, comprising:
   a sensor sensing a turning angle of the vehicle and a speed of said vehicle;
   a control device asserting a control signal according to said turning angle; and
   a plurality of light emitting elements in communication with said control device, integrated into a head-up display module, and emitting light to constitute a variable pattern in response to said control signal;
   wherein a first pattern is shown in response to said control signal at a certain turning direction, a certain turning angle and a first speed of said vehicle, and a second pattern is shown in response to said control signal at said certain turning direction, said certain turning angle and a second speed of said vehicle, and an end light-emitting element that is actuated in said first pattern is closer to said turning direction than an end light-emitting element that is actuated in said second pattern is if said first speed is higher than said second speed.

92. The vehicular turning indicator according to claim 91 wherein said sensor is mounted to a steering wheel of said vehicle for detecting a rotation degree of said steering wheel, and outputting a digital signal indicative of said turning angle according to said rotation degree of said steering wheel.

93. The vehicular turning indicator according to claim 91 wherein said control device comprises:
   a micro-processor in communication with said sensor, determining what pattern is to be shown according to said turning angle; and
   a control unit in communication with said micro-processor and said series of light-emitting elements, asserting said control signal to actuate a selected number of said series of light-emitting elements to emit light, thereby showing the desired pattern determined by said microprocessor.

94. The vehicular turning indicator according to claim 91 wherein said light-emitting elements to be actuated in response to said control signal are determined said microprocessor according to a lookup table.

95. The vehicular turning indicator according to claim 91 wherein a first pattern is formed by actuating a first number of said light-emitting elements in response to said control signal at a certain turning direction, a certain turning angle and a first speed of said vehicle, and a second pattern is formed by actuating a second number of said light-emitting elements in response to said control signal at said certain turning direction, said certain turning angle and a second speed of said vehicle, and said first number is different from said second number if said first speed is different from said second speed.

96. The vehicular turning indicator according to claim 95 first number is greater than said second number if said first speed is higher than said second speed.

97. The vehicular turning indicator according to claim 91 wherein the luminance of said light-emitting elements actuated in response to said control signal varies with said speed of said vehicle.

98. The vehicular turning indicator according to claim 91 wherein the luminance of said light-emitting elements actuated in response to said control signal increases with said speed of said vehicle.

99. The vehicular turning indicator according to claim 91 wherein the color of said light-emitting elements actuated in response to said control signal varies with said speed of said vehicle.

100. The vehicular turning indicator according to claim 91 wherein the color of said light-emitting elements actuated in response to said control signal varies with said turning degree of said vehicle.

101. The vehicular turning indicator according to claim 91 wherein the luminance of said light-emitting elements actuated in response to said control signal varies with said turning degree of said vehicle.

102. The vehicular turning indicator according to claim 91 wherein a plurality of patterns are sequentially shown in response to said control signal for a specific turning angle, and the transformation of said plurality of patterns follows a predetermined rule.

103. The vehicular turning indicator according to claim 102 wherein a transformation rate of said plurality of patterns varies with a speed of said vehicle.

104. The vehicular turning indicator according to claim 102 wherein a transformation rate of said plurality of patterns increases with a speed of said vehicle.

105. The vehicular turning indicator according to claim 91 wherein said head-up display is disposed on the front windscreen of said vehicle.

106. The vehicular turning indicator according to claim 91 wherein said head-up display is one of a vacuum fluorescent display (VFD), a digital light processor (DLP) display, a liquid crystal on silicon (LCOS) display, a thin film transistor liquid crystal display (TFTLCD) and a transparent liquid crystal display (transparent LCD).

107. A vehicular turning indicator for automatically showing a turning degree of a vehicle, comprising:
   a sensor sensing a turning angle of the vehicle and a speed of said vehicle;
   a plurality of lightening units independently optionally brighten according to said turning angle of said vehicle; and
   a control device in communication with said sensor and said plurality of lightening units, designating a maximum number of said plurality of lightening units to brighten according to said turning angle, and controlling said designated lightening units to sequentially twinkle in a predetermined manner;
   wherein a first pattern is shown at a certain turning direction, a certain turning angle and a first speed of said vehicle, and a second pattern is shown at said certain turning direction, said certain turning angle and a second speed of said vehicle, and an end lightening unit that brightens in said first pattern is closer to said turning direction than an end lightening unit that brightens in said second pattern is if said first speed is higher than said second speed.

108. The vehicular turning indicator according to claim 107 wherein said sensor is mounted to a steering wheel of said vehicle for detecting a rotation degree of said steering wheel, and outputting a digital signal indicative of said turning angle according to said rotation degree of said steering wheel.

109. The vehicular turning indicator according to claim 107 wherein said control device comprises:
   a micro-processor in communication with said sensor, determining said maximum number of said plurality of lightening units to brighten and said predetermined manner according to said turning angle; and
   a control unit in communication with said micro-processor and said plurality of lightening units, sequentially twinkling said maximum number of lightening units in said predetermined manner.

110. The vehicular turning indicator according to claim 107 wherein said maximum number of said plurality of lightening units to brighten is determined according to a lookup table.

111. The vehicular turning indicator according to claim 107 wherein a first pattern is formed by turning on a first maximum number of said lightening units designated at a certain turning direction, a certain turning angle and a first speed of said vehicle, and a second pattern is formed by turning on a second maximum number of said lightening units designated at said certain turning direction, said certain turning angle and a second speed of said vehicle, and said first maximum number of said lightening units is different from said second maximum number of said lightening units if said first speed is different from said second speed.

112. The vehicular turning indicator according to claim 111 wherein said first maximum number of said lightening units is greater than said second maximum number of said lightening units if said first speed is higher than said second speed.

113. The vehicular turning indicator according to claim 107 wherein the luminance of said lightening units varies with said speed of said vehicle.

114. The vehicular turning indicator according to claim 107 wherein the luminance of said lightening units increases with said speed of said vehicle.

115. The vehicular turning indicator according to claim 107 wherein the color of said lightening units varies with said speed of said vehicle.

116. The vehicular turning indicator according to claim 107 wherein the color of said lightening units varies with said turning degree of said vehicle.

117. The vehicular turning indicator according to claim 107 wherein the luminance of said lightening units varies with said turning degree of said vehicle.

118. The vehicular turning indicator according to claim 107 wherein said plurality of lightening units are disposed on the body of said vehicle between the trunk door and the bumper.

119. The vehicular turning indicator according to claim 107 wherein said plurality of lightening units are disposed on the body of said vehicle between the engine room and the bumper.

120. The vehicular turning indicator according to claim 107 wherein said plurality of lightening units are disposed on the body of said vehicle under a lamp assembly.

121. The vehicular turning indicator according to claim 120 wherein said lamp assembly comprises an indicator light, a backup light, a brake light, an auxiliary brake light and/or a headlight lamp.

122. The vehicular turning indicator according to claim 107 wherein said plurality of lightening units are arranged in a linear manner, a concentric manner or a helix manner.

123. The vehicular turning indicator according to claim 107 wherein said plurality of lightening units are disposed in said interior rearview mirror module.

124. The vehicular turning indicator according to claim 107 wherein said plurality of lightening units are disposed in said exterior rearview mirror module.

125. The vehicular turning indicator according to claim 107 wherein said plurality of lightening units are disposed on the housing of said exterior rearview mirror module.

126. The vehicular turning indicator according to claim 107 wherein said plurality of lightening units include at least two sets of lightening units for emitting different colors.

127. The vehicular turning indicator according to claim 107 wherein said predetermined manner includes a step of sequentially and accumulatively brightening said lightening units one by one until said maximum number of said lightening units is reached.

128. The vehicular turning indicator according to claim 107 wherein said predetermined manner further includes a step of sequentially and accumulatively darkening said lightening units one by one after said maximum number of said lightening units all illuminate.

129. The vehicular turning indicator according to claim 107 wherein said predetermined manner includes a step of sequentially and accumulatively brightening said lightening units portion by portion until the maximum number of said lighting units is reached, wherein portions illuminating at two adjacent time points include at least one common lightening unit.

130. The vehicular turning indicator according to claim 107 wherein said predetermined manner includes a step of sequentially darkening one of the maximum number of said lightening units after said maximum number of said lightening units all illuminate.

131. A vehicular turning indicator for automatically showing a turning degree of a vehicle, comprising:
   a first sensor sensing a turning angle of the vehicle;
   a second sensor sensing a speed of said vehicle;
   a control device asserting a control signal according to said turning angle and said speed of said vehicle; and
   a plurality of lightening units in communication with said control device, selectively brightening to constitute a variable pattern in response to said control signal;
   wherein a first pattern is formed by turning on a first number of said lightening units in response to said control signal at a first speed of said vehicle, and a second pattern is formed by turning on a second number of said lightening units in response to said control signal at a second speed of said vehicle, and said first number is different from said second number if said first speed is different from said second speed.

132. The vehicular turning indicator according to claim 131 wherein said first sensor is mounted to a steering wheel of said vehicle for detecting a rotation degree of said steering wheel, and outputting a first digital signal indicative of said turning angle according to said rotation degree of said steering wheel, and said second sensor outputs a second digital signal indicative of said speed of said vehicle.

133. The vehicular turning indicator according to claim 131 wherein said control device comprises:

a micro-processor in communication with said first and said second sensors, determining what pattern is to be shown in response to said first and said second digital signals; and a control unit in communication with said micro-processor and said plurality of lightening units, asserting said control signal to turn on a selected number of said plurality of lightening units, thereby showing the desired pattern determined by said micro-processor.

134. The vehicular turning indicator according to claim 131 wherein said lightening units to brighten in response to said control signal are determined by according to a lookup table.

135. The vehicular turning indicator according to claim 131 wherein said first number is greater than said second number if said first speed is higher than said second speed.

136. The vehicular turning indicator according to claim 131 wherein a first pattern is formed by turning on a first number of said lightening units in response to said control signal at a certain turning direction, a certain turning angle and a first speed of said vehicle, and a second pattern is formed by turning on a second number of said lightening units in response to said control signal at said certain turning direction, said certain turning angle and a second speed of said vehicle, and said first number is different from said second number if said first speed is different from said second speed.

137. The vehicular turning indicator according to claim 136 wherein said first number is greater than said second number if said first speed is higher than said second speed.

138. The vehicular turning indicator according to claim 131 wherein a first pattern is shown in response to said control signal at a certain turning direction, a certain turning angle and a first speed of said vehicle, and a second pattern is shown in response to said control signal at said certain turning direction, said certain turning angle and a second speed of said vehicle, and an end lightening unit that brightens in said first pattern is closer to said turning direction than an end lightening unit that brightens in said second pattern is if said first speed is higher than said second speed.

139. The vehicular turning indicator according to claim 131 wherein the luminance of said lightening units brightening in response to said control signal varies with said speed of said vehicle.

140. The vehicular turning indicator according to claim 131 wherein the luminance of said lightening units brightening in response to said control signal increases with said speed of said vehicle.

141. The vehicular turning indicator according to claim 131 wherein the color of said lightening units brightening in response to said control signal varies with said speed of said vehicle.

142. The vehicular turning indicator according to claim 131 wherein the color of said lightening units brightening in response to said control signal varies with said turning degree of said vehicle.

143. The vehicular turning indicator according to claim 131 wherein the luminance of said lightening units brightening in response to said control signal varies with said turning degree of said vehicle.

144. The vehicular turning indicator according to claim 131 wherein a plurality of patterns are sequentially shown in response to said control signal for a specific turning direction and a specific turning angle, and the transformation of said plurality of patterns follows a predetermined rule.

145. The vehicular turning indicator according to claim 144 wherein a transformation rate of said plurality of patterns varies with a speed of said vehicle.

146. The vehicular turning indicator according to claim 144 wherein a transformation rate of said plurality of patterns increases with said speed of said vehicle.

147. The vehicular turning indicator according to claim 131 wherein said plurality of lightening units are disposed on the body of said vehicle between the trunk door and the bumper.

148. The vehicular turning indicator according to claim 131 wherein said plurality of lightening units are disposed on the body of said vehicle between the engine room and the bumper.

149. The vehicular turning indicator according to claim 131 wherein said plurality of lightening units are disposed on the body of said vehicle under a lamp assembly.

150. The vehicular turning indicator according to claim 149 wherein said lamp assembly comprises an indicator light, a backup light, a brake light, an auxiliary brake light and/or a headlight lamp.

151. The vehicular turning indicator according to claim 131 wherein said plurality of lightening units are arranged in a linear manner, a concentric manner or a helix manner.

152. The vehicular turning indicator according to claim 131 wherein said plurality of lightening units are disposed in said interior rearview mirror module.

153. The vehicular turning indicator according to claim 131 wherein said plurality of lightening units are disposed in said exterior rearview mirror module.

154. The vehicular turning indicator according to claim 131 wherein said plurality of lightening units are disposed on the housing of said exterior rearview mirror module.

155. The vehicular turning indicator according to claim 131 wherein said plurality of lightening units include at least two sets of lightening units for emitting different colors.

* * * * *